United States Patent
Kim et al.

(10) Patent No.: US 11,089,395 B2
(45) Date of Patent: Aug. 10, 2021

(54) DISPLAY DEVICE AND METHOD OF PROVIDING SOUND FROM THE SAME

(71) Applicant: Samsung Display Co., LTD., Yongin-si (KR)

(72) Inventors: Jong Tae Kim, Seoul (KR); Sang Wook Yoo, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/852,561

(22) Filed: Apr. 20, 2020

(65) Prior Publication Data

US 2021/0044880 A1 Feb. 11, 2021

(30) Foreign Application Priority Data

Aug. 9, 2019 (KR) .................. 10-2019-0097286

(51) Int. Cl.
*H04R 1/02* (2006.01)

(52) U.S. Cl.
CPC ......... *H04R 1/028* (2013.01); *H04R 2400/03* (2013.01); *H04R 2499/15* (2013.01)

(58) Field of Classification Search
CPC ....................................................... H04R 1/02
See application file for complete search history.

(56) References Cited

U.S. PATENT DOCUMENTS

| | | | |
|---|---|---|---|
| 2012/0243719 A1* | 9/2012 | Franklin | .................. H04R 1/02 |
| | | | 381/333 |
| 2015/0263684 A1* | 9/2015 | Tu | .......................... H04R 3/007 |
| | | | 381/120 |

FOREIGN PATENT DOCUMENTS

| | | |
|---|---|---|
| JP | 2017126222 A | 7/2017 |
| KR | 1020080104253 A | 12/2008 |
| KR | 1020150110126 A | 10/2015 |
| KR | 1020160088526 A | 7/2016 |
| KR | 1020160095601 A | 8/2016 |
| KR | 1020170065054 A | 6/2017 |
| KR | 1020180106473 A | 10/2018 |

\* cited by examiner

*Primary Examiner* — Olisa Anwah

(74) *Attorney, Agent, or Firm* — Cantor Colburn LLP

(57) ABSTRACT

A display device includes: a display panel; a sound generation device disposed on one surface of the display panel, where the sound generation device vibrates the display panel based on sound driving voltages to output sound; and a sound driving circuit which generates the sound driving voltages, which is compensated based on an ambient temperature of the sound generation, based on sound data and supplies the sound driving voltages to the sound generation device.

23 Claims, 21 Drawing Sheets

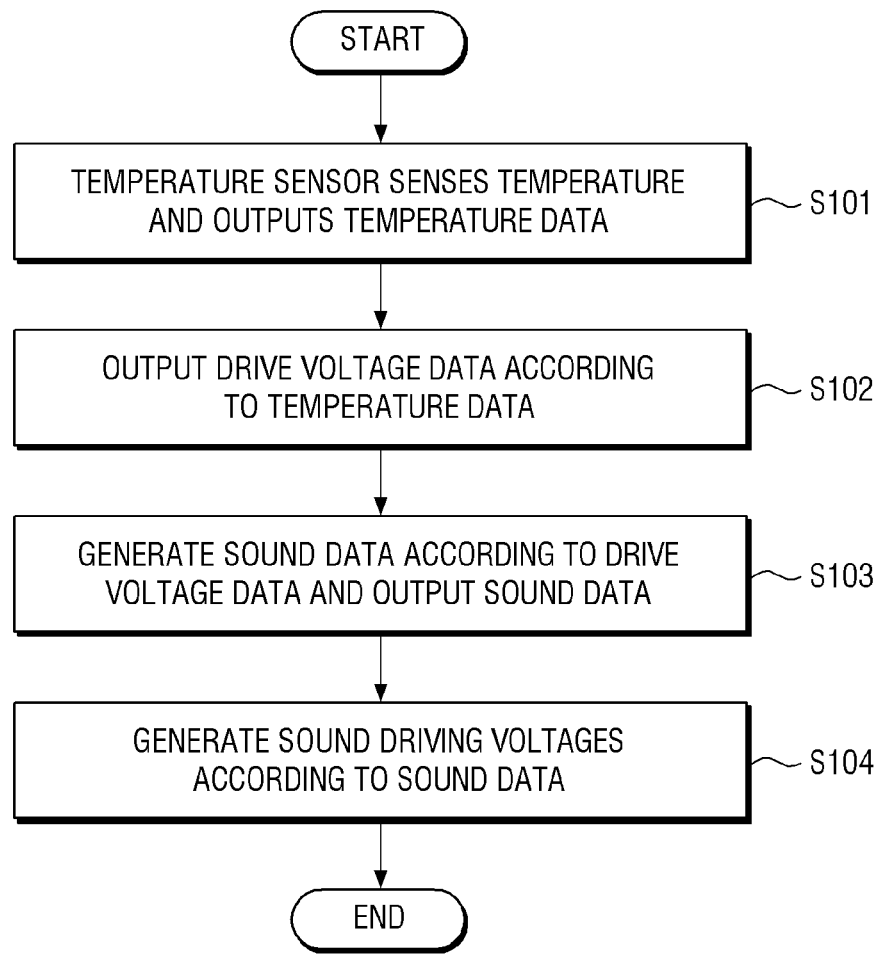

DISPLAY DEVICE AND METHOD OF PROVIDING SOUND FROM THE SAME

This application claims priority to Korean Patent Application No. 10-2019-0097286 filed on Aug. 9, 2019, and all the benefits accruing therefrom under 35 U.S.C. § 119, the content of which in its entirety is herein incorporated by reference.

BACKGROUND

1. Field

The disclosure relates to a display device and a method of providing sound from the display device.

2. Description of the Related Art

With development into an information society, demands on various display devices for displaying images are increasing. Recently, display devices are applied to various electronic devices, such as a smart phone, a digital camera, a laptop computer, a navigation device, and a smart television, for example. A display device may include a display panel for displaying images and a sound generation device for providing sound.

SUMMARY

While a display device displays images, the temperature of the display device may rise. Also, a display device may be affected by ambient air temperature. For example, when a display device is used outdoors in winter, the temperature of the display device may drop to 0° C. or below. However, when a display device is used in a car in summer, the temperature of the display device may rise up to 80° C.

The impedance and capacitance of a sound generation device may vary depending on the temperature of the display device, such that a sound pressure level of sound provided by the sound generation device may vary according to the temperature. In other words, a user may feel differently about a sound when the temperature of the display device is changed.

Embodiments of the disclosure provide a display device for compensating or reducing a difference in the sound pressure level of sound caused by a temperature change of a display device.

Embodiments of the disclosure also provide a method of providing sound from a display device to compensate or reduce a difference in the sound pressure level of sound caused by a temperature change of a display device.

According to an embodiment of the disclosure, a display device includes: a display panel; a sound generation device disposed on a surface of the display panel, where the sound generation device vibrates the display panel based on sound driving voltages to output sound; and a sound driving circuit which generates the sound driving voltages, which is compensated based on an ambient temperature of the sound generation device, based on sound data and supplies the sound driving voltages to the sound generation device.

In an embodiment, the display device may further include: a temperature sensor which senses the temperature and output temperature data; a memory which outputs sound driving voltage data based on the temperature data; and a main processor which generates the sound databased on drive voltage data corresponding to a frequency and output the sound data to the sound driving circuit.

In an embodiment, the memory may store sound driving voltage data on the basis of a plurality of temperature ranges.

In an embodiment, the memory may select sound driving voltage data of one of the plurality of temperature ranges and output the selected sound driving voltage data to the main processor.

In an embodiment, the plurality of temperature ranges may include a first temperature range and a second temperature range lower than the first temperature range, and a maximum difference between sound driving voltage data of the first temperature range and sound driving voltage data of the second temperature range in a frequency domain of a first frequency or lower may be greater than a maximum difference between sound driving voltage data of the first temperature range and sound driving voltage data of the second temperature range in a frequency domain of a higher frequency than the first frequency.

In an embodiment, the plurality of temperature ranges may include a first temperature range and a second temperature range lower than the first temperature range, sound driving voltage data of a second frequency or lower in the first temperature range may differ from sound driving voltage data of the second frequency or lower in the second temperature range, and sound driving voltage data of a higher frequency than the second frequency in the first temperature range may be identical to sound driving voltage data of the higher frequency than the second frequency in the second temperature range.

In an embodiment, the display device may further include a main circuit board, on which the temperature sensor, the memory and the main processor are disposed.

In an embodiment, the display device may further include a display circuit board attached to a side of the display panel and disposed on the surface of the display panel, where which the sound driving circuit is disposed on the display circuit board; and a cable which connects the display circuit board and the main circuit board to each other.

In an embodiment, the display device may further include a bracket disposed between the display panel and the main circuit board, where a cable hole may be defined through the bracket, and the cable may be disposed through the cable hole.

In an embodiment, the sound driving circuit may include: a digital-analog converter which generates the sound driving voltages corresponding to the sound data; and a temperature compensator which compensate the sound driving voltages based on the ambient temperature of the sound generation device.

In an embodiment, the temperature compensator may include: an input terminal and an output terminal; a first resistor disposed between the input terminal and the output terminal; and a second resistor and a temperature-resistant device disposed in parallel between the output terminal and a low-potential voltage source, and a resistance value of the temperature-resistant device may vary with the temperature.

In an embodiment, the resistance value of the temperature-resistant device may be inversely proportional to the temperature.

In an embodiment, a sound driving voltage output to the output terminal, a sound driving voltage input to the input terminal, the resistance value of the temperature-resistant device, a resistance value of the first resistor, and a resistance value of the second resistor may satisfy the following equation:

$$Vout = Vin \times \frac{RVth \cdot RV2}{RVth \cdot RV2 + VR1(RVth + RV2)},$$

where Vout denotes the sound driving voltage output to the output terminal, Vin denotes the sound driving voltage input to the input terminal, RVth denotes the resistance value of the temperature-resistant device, VR1 denotes the resistance value of the first resistor, and RV2 denotes the resistance value of the second resistor.

In an embodiment, the display device may further include a display circuit board attached to a side of the display panel and disposed on the surface of the display panel, where the sound driving circuit is disposed on the display circuit board.

In an embodiment, the display device may further include: a display circuit board attached to a side of the display panel and disposed on the surface of the display panel; and a sound circuit board disposed between the sound generation device and the display circuit board, where the sound driving circuit is disposed on the sound circuit board.

In an embodiment, the display device may further include: a temperature compensator which compensates the sound driving voltages based on the ambient temperature of the sound generation device; a display circuit board attached to a side of the display panel and disposed on the surface of the display panel; and a sound circuit board disposed between the sound generation device and the display circuit board, where the sound driving circuit is disposed on the sound circuit board, the temperature compensator may be disposed on the sound circuit board, and the sound driving circuit may be disposed on the display circuit board.

According to an embodiment of the disclosure, a method of providing sound from a display device includes: sensing a temperature with a temperature sensor of the display device and outputting temperature data based on the temperature sensed by the temperature sensor; outputting drive voltage data corresponding to a frequency based on the temperature data; generating sound data based on the drive voltage data corresponding to the frequency; generating sound driving voltages based on the sound data; and vibrating, by a sound generation device disposed on a surface of a display panel of the display device, the display panel based on the sound driving voltages to output sound.

In an embodiment, the outputting the drive voltage data corresponding to the frequency based on the temperature data may include selecting sound driving voltage data of one of a plurality of temperature ranges corresponding to the temperature of the temperature data and outputting the selected sound driving voltage data.

In an embodiment, the plurality of temperature ranges may include a first temperature range and a second temperature range lower than the first temperature range, and a maximum difference between sound driving voltage data of the first temperature range and sound driving voltage data of the second temperature range in a frequency domain of a first frequency or lower may be greater than a maximum difference between sound driving voltage data of the first temperature range and sound driving voltage data of the second temperature range in a frequency domain of a higher frequency than the first frequency.

In an embodiment, the plurality of temperature ranges may include a first temperature range and a second temperature range lower than the first temperature range, sound driving voltage data of a second frequency or lower in the first temperature range may differ from sound driving voltage data of the second frequency or lower in the second temperature range, and sound driving voltage data of a higher frequency than the second frequency in the first temperature range may be identical to sound driving voltage data of the higher frequency than the second frequency in the second temperature range.

According to an embodiment of the disclosure, a method of providing sound from a display device includes: receiving drive voltage data corresponding to a frequency stored in a memory, generating sound data based on the drive voltage data corresponding to the frequency, and outputting the sound data; generating sound driving voltages based on the sound data; applying an ambient temperature to the sound driving voltages; and vibrating, by a sound generation device disposed on a surface of a display panel of the display device, the display panel according to the sound driving voltages to output sound.

In an embodiment, the applying the ambient temperature to the sound driving voltages may include compensating the sound driving voltage based on the ambient temperature using a first resistor disposed between an input terminal and an output terminal, a second resistor disposed in parallel between the output terminal and a low-potential voltage source, and a temperature-resistant device, a resistance value of which varies according to a temperature.

In an embodiment, the resistance value of the temperature-resistant device may be inversely proportional to the temperature.

In an embodiment, a sound driving voltage output to the output terminal, a sound driving voltage input to the input terminal, the resistance value of the temperature-resistant device, a resistance value of the first resistor, and a resistance value of the second resistor may satisfy the following equation:

$$Vout = Vin \times \frac{RVth \cdot RV2}{RVth \cdot RV2 + VRI(RVth + RV2)},$$

where Vout denotes the sound driving voltage output to the output terminal, Vin denotes the sound driving voltage input to the input terminal, RVth denotes the resistance value of the temperature-resistant device, VR1 denotes the resistance value of the first resistor, and RV2 denotes the resistance value of the second resistor.

BRIEF DESCRIPTION OF THE DRAWINGS

These and/or other features of the invention will become apparent and more readily appreciated from the following description of the embodiments, taken in conjunction with the accompanying drawings, in which:

FIG. 13 is a flowchart illustrating a method of providing sound from a display device according to an exemplary embodiment of the disclosure;

DETAILED DESCRIPTION

Figure 1:
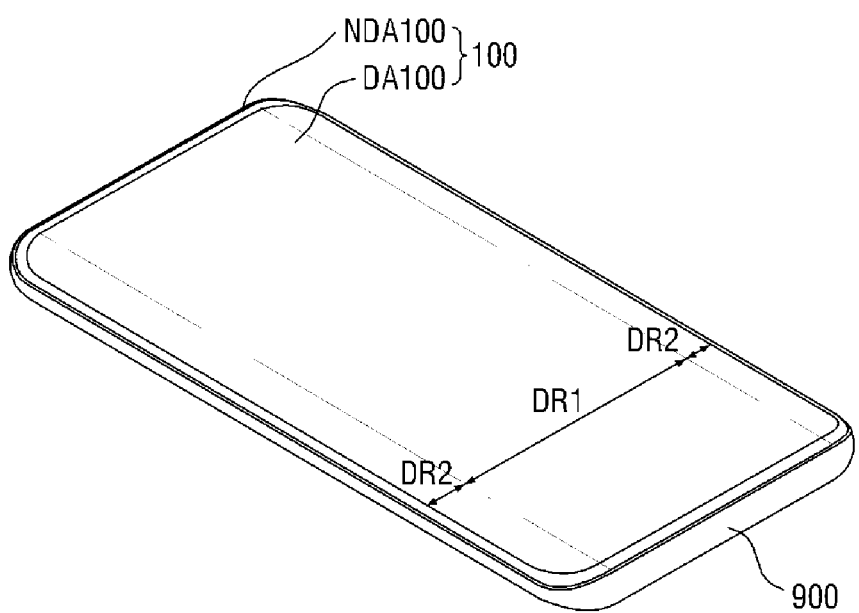
FIG. 1 is a perspective view of a display device according to an exemplary embodiment of the disclosure.

The invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

Figure 2:
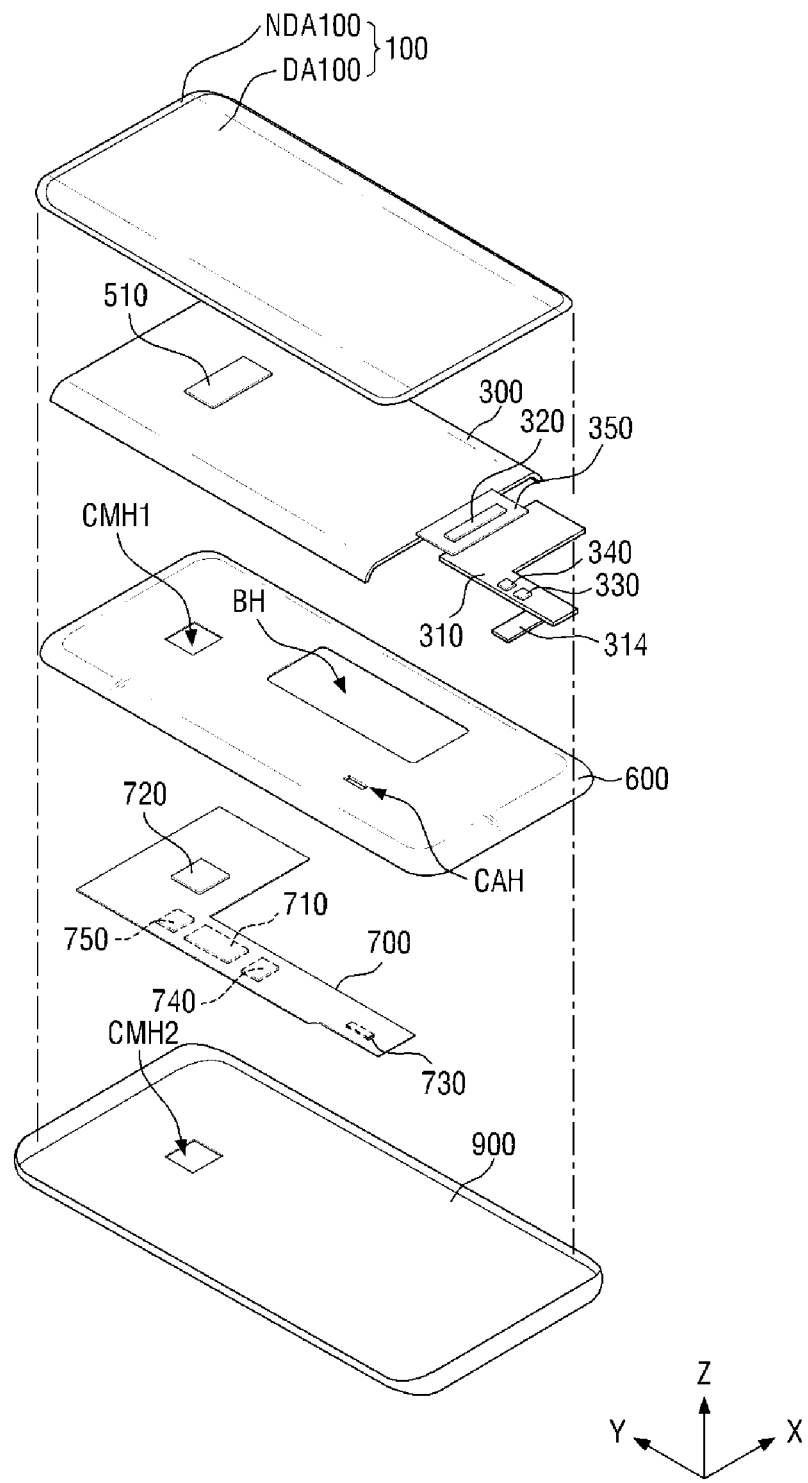
FIG. 2 is an exploded perspective view of the display device according to an exemplary embodiment of the disclosure.

FIG. 1 is a perspective view of a display device according to an exemplary embodiment of the disclosure. FIG. 2 is an exploded perspective view of the display device according to an exemplary embodiment of the disclosure.

Referring to FIGS. 1 and 2, an exemplary embodiment of a display device 10 includes a cover window 100, a display panel 300, a display circuit board 310, a display driver circuit 320, a flexible film 350, a sound generation device 510, a bracket 600, a main circuit board 700, and a lower cover 900.

Herein, the term "upper" indicates a direction in which the cover window 100 is disposed on the basis of the display panel 300, that is, a Z-axis direction, and the term "lower" indicates a direction in which the bracket 600 is disposed on the basis of the display panel 300, that is, the opposite direction to the Z-axis direction. Also, the terms "left," "right," "up," and "down" indicate directions when the display panel 300 is seen in a plan view in the Z-axis direction. For example, "left" indicates the opposite direction to an X-axis direction, "right" indicates the X-axis direction, "up" indicates the Z-axis direction, and "down" indicates the opposite direction to the Z-axis direction.

The display device 10 may have a rectangular shape in a plan view. In one exemplary embodiment, for example, as shown in FIGS. 1 and 2, the display device 10 may have a rectangular shape having short sides in a first direction (the X-axis direction) and long sides in a second direction (a Y-axis direction) in a plan view. The corner at which a first-direction (X-axis direction) short side meets a second-direction (Y-axis direction) long side may be rounded with a certain curvature or have a right angle. The planar shape of the display device 10 is not limited to a rectangle and may be variously modified to be another polygon, a circle, or an oval, for example.

The display device 10 may include a first region DR1, which is flat, and second regions DR2 which extend from the left and right sides of the first region DR1. The second regions DR2 may be flat or curved. In an exemplary embodiment, where the second regions DR2 are flat, the angle between the first region DR1 and the second regions DR2 may be an obtuse angle. In an alternative exemplary embodiment, where the second regions DR2 are curved, the second regions DR2 may be curved with a constant radius of curvature or a variable radius of curvature.

FIG. 1 shows an exemplary embodiment in which the second regions DR2 extend from each of the left and right sides of the first region DR1, but the disclosure is not limited thereto. In an alternative exemplary embodiment, the second regions DR2 may extend from only one of the left and right sides of the first region DR1. Alternatively, the second regions DR2 may extend not only from the left and right sides of the first region DR1 but also from at least one of the upper and lower sides. Hereinafter, for convenience of description, exemplary embodiments where the second regions DR2 are disposed on the left and right edges of the display device 10 will be described in detail.

The cover window 100 may be disposed on the display panel 300 to cover the upper surface of the display panel 300, such that the cover window 100 may effectively protect the upper surface of the display panel 300.

The cover window 100 may include a transparent portion DA100 corresponding to the display panel 300 and a light-shielding portion NDA100 corresponding to a region other than the display panel 300. The cover window 100 may be disposed in the first region DR1 and the second regions DR2. The transparent portion DA100 may be disposed in a part of the first region DR1 and parts of the second regions DR2. The light-shielding portion NDA100 may be opaque. Alternatively, the light-shielding portion NDA100 may be a decoration layer in which a pattern is formed to be shown to a user.

The display panel 300 may be disposed under the cover window 100. The display panel 300 may be disposed to overlap the transparent portion 100DA of the cover window 100. The display panel 300 may be disposed in the first region DR1 and the second regions DR2 such that an image of the display panel 300 is displayed in the second regions DR2 as well as the first region DR1.

The display panel 300 may be a light-emitting display panel including light-emitting elements. In one exemplary embodiment, for example, the display panel 300 may be an organic light-emitting display panel employing organic light-emitting diodes ("LED"s) including an organic light-emitting layer, a micro-LED display panel employing micro-LEDs, a quantum dot light-emitting display panel employing quantum dot LEDs including a quantum dot light-emitting layer, or an inorganic light-emitting display panel employing inorganic light-emitting elements including an inorganic semiconductor. Hereinafter, for convenience of description, exemplary embodiments where the display panel 300 is an organic light-emitting display panel will be described in detail.

The display circuit board 310 and the display driver circuit 320 may be attached to one side of the display panel 300. One end of the display circuit board 310 may be attached onto pads which are provided on the side of the display panel 300 using an anisotropic conductive film. The display circuit board 310 may be a flexible printed circuit board ("FPCB") which is bendable, a rigid printed circuit board which is hard, thereby not effectively bendable, or a hybrid printed circuit board including both of a rigid printed circuit board and a FPCB.

The display driver circuit 320 receives control signals and power supply voltages through the display circuit board 310, and generates and outputs signals and voltages for driving the display panel 300. The display driver circuit 320 may be formed as an integrated circuit and attached onto the display panel 300 in a chip on glass ("COG"), chip on plastic ("COP"), or ultrasonic method, but not being limited thereto. In one exemplary embodiment, for example, the display driver circuit 320 may be attached onto the display circuit board 310.

In an exemplary embodiment, a touch driving circuit 330 may be disposed on the display circuit board 310. The touch driving circuit 330 may be formed as an integrated circuit and attached onto the upper surface of the display circuit board 310. The touch driving circuit 330 may be electrically connected to touch electrodes in a touch sensor layer of the display panel 300 through the display circuit board 310. The touch driving circuit 330 may apply touch driving signals to driving electrodes among touch electrodes, sense charge variations of the capacitances between the driving electrodes and sensing electrodes through the sensing electrodes among the touch electrodes, and thereby output touch data including touch coordinates of a user.

A sound driving circuit 340 may be disposed on the display circuit board 310. The sound driving circuit 340 receives sound data from a main processor 710. The sound driving circuit 340 generates sound driving voltages corresponding to the sound data and outputs the sound driving voltages to the sound generation device 510. The sound driving voltages may include a first sound driving voltage and a second sound driving voltage. The sound generation device 510 may contract or expand based on the first sound driving voltage and the second sound driving voltage and output sound by vibrating the display panel 300 due to the contraction or expansion of the sound generation device 510.

In an exemplary embodiment, a power supply circuit may be disposed on the display circuit board 310 to supply display driving voltages for driving the display driver circuit 320. Accordingly, in such an embodiment, the display driving voltages for driving the display panel 300 and the sound driving voltages for driving the sound generation device 510 may be generated and supplied from different circuits such that the display driving voltages for driving the display panel 300 may be effectively prevented from being affected by the sound driving voltages for driving the sound generation device 510.

One side of the flexible film 350 may be attached onto the upper surface of the display panel 300 on the lower side of the display panel 300 using an anisotropic conductive film. The opposite side of the flexible film 350 may be attached onto the upper surface of the display circuit board 310 on the upper side of the display circuit board 310 using an anisotropic conductive film. The flexible film 350 may be a flexible film which is bendable.

In an alternative exemplary embodiment, the flexible film 350 may be omitted, and the display circuit board 310 may be directly attached to the side of the display panel 300. In such an embodiment, the side of the display panel 300 may be bent downward.

The sound generation device 510 may be disposed on a surface of the display circuit board 310. The sound generation device 510 may be a piezoelectric element or a piezoelectric actuator which vibrates the display panel 300 using a piezoelectric material contracting or expanding based on an applied voltage.

The bracket 600 may be disposed under the display panel 300. The bracket 600 may include a plastic, a metal, or a combination thereof. In an exemplary embodiment, a first camera hole CMH1 in which a camera device 720 is inserted, a battery hole BH in which a battery is disposed, and a cable hole CAH through which a cable 314 connected to the display circuit board 310 passes may be defined or formed in the bracket 600. Also, in the bracket 600, a hole or a groove may be defined or formed in a region corresponding to the sound generation device 510.

The main circuit board 700 may be disposed under the bracket 600. The main circuit board 700 may be a printed circuit board or a FPCB.

The main circuit board 700 may include the main processor 710, the camera device 720, a main connector 730, a memory 740, and a temperature sensor 750. The camera device 720 may be disposed on both of the upper and lower surfaces of the main circuit board 700, and the main processor 710, the memory 740, and the temperature sensor 750 may be disposed on the upper surface of the main circuit board 700.

The main processor 710 may control entire or overall operations of the display device 10. In one exemplary embodiment, for example, the main processor 710 may output digital video data to the display driver circuit 320 through the display circuit board 310 so that the display panel 300 displays an image. In such an embodiment, the main processor 710 may receive touch data from the touch driving circuit 330, determine touch coordinates of a user, and then execute an application indicated by an icon displayed on the touch coordinates of the user.

The main processor 710 may output sound data to the sound driving circuit 340 to output a sound by causing the sound generation device 510 to vibrate the display panel 300. The main processor 710 may generate sound data using sound driving voltage data input thereto from the memory 740. The main processor 710 may be an application processor, a central processing unit, or a system chip which is an integrated circuit.

The camera device 720 processes a video frame of a still image or a video which is acquired by an image sensor in a camera mode and outputs the processed video frame to the main processor 710.

The cable 314 disposed through the cable hole CAH of the bracket 600 may be connected to the main connector 730. Accordingly, the main circuit board 700 may be electrically connected to the display circuit board 310.

The memory 740 stores sound driving voltage data corresponding to temperature. In one exemplary embodiment, for example, the memory 740 may store sound driving voltage data corresponding to a plurality of temperature ranges. The memory 740 may output sound driving voltage data based on temperature data input thereto from the main processor 710. In one exemplary embodiment, for example, when temperature data corresponding to a first temperature range is input, the memory 740 may output sound driving voltage data stored therein to correspond to the first temperature range.

The memory 740 is implemented as a look-up table in which output data is determined by input data and may be a non-volatile memory such as an electrically erasable programmable read-only memory ("EEPROM").

The temperature sensor 750 senses the ambient temperature, converts the sensed temperature into temperature data, which is digital data, and outputs the temperature data to the main processor 710. Since sound data for driving the sound generation device 510 is determined by the temperature sensed by the temperature sensor 750, the temperature sensor 750 may be disposed close to the sound generation device 510. In one exemplary embodiment, for example, the temperature sensor 750 may be disposed above the main processor 710 as shown in FIG. 2. Alternatively, the temperature sensor 750 may be disposed on the display circuit board 310 rather than the main circuit board 700. Alternatively, the temperature sensor 750 may be disposed on the lower surface of an panel bottom cover 400.

In an exemplary embodiment, a mobile communication module for exchanging wireless signals with at least one of a base station, an external terminal, and a server in a mobile communication network may be additionally disposed or installed on the main circuit board 700. The wireless signals may include voice signals, video call signals, or various forms of data for exchanging text or multimedia messages.

The lower cover 900 may be disposed under the bracket 600 and the main circuit board 700. The lower cover 900 and the bracket 600 may be joined and fixed together. The lower cover 900 may define the lowermost-surface appearance of the display device 10. The lower cover 900 may include a plastic, a metal, or a combination thereof.

In an exemplary embodiment, a second camera hole CMH2 in which the lower surface of the camera device 720 is exposed may be defined or formed in the lower cover 900. The location of the camera device 720 and the locations of the first and second camera holes CMH1 and CMH2 corresponding to the camera device 720 are not limited to those shown in FIG. 2.

According to an exemplary embodiment shown in FIGS. 1 and 2, sound data for driving the sound generation device 510 may be selected from the memory 740 based on temperature data of the temperature sensor 750 disposed close to the sound generation device 510. Accordingly, the sound driving circuit 340 may generate sound driving voltages based on sound data, to which the ambient temperature of the sound generation device 510 is applied, and output the sound driving voltages to the sound generation device 510. Therefore, it is possible to reduce or compensate a difference in the sound pressure level of sound, which is generated by the sound generation device 510, caused by a change in the ambient temperature of the sound generation device 510. Herein, the sound data, to which the ambient temperature of the sound generation device 510 is applied, may be sound data selected or converted based on the ambient temperature.

According to an exemplary embodiment shown in FIGS. 1 and 2, the sound generation device 510, which is not externally exposed, may output sound using the display panel 300 as a plate of vibration. Accordingly, it is possible to omit a call receiver for outputting a counterpart's voice from the upper surface of the display device 10 such that the transparent portion DA100 of the cover window 100 may be widened. Therefore, it is possible to increase a region in which an image is displayed by the display panel 300.

Figure 3:
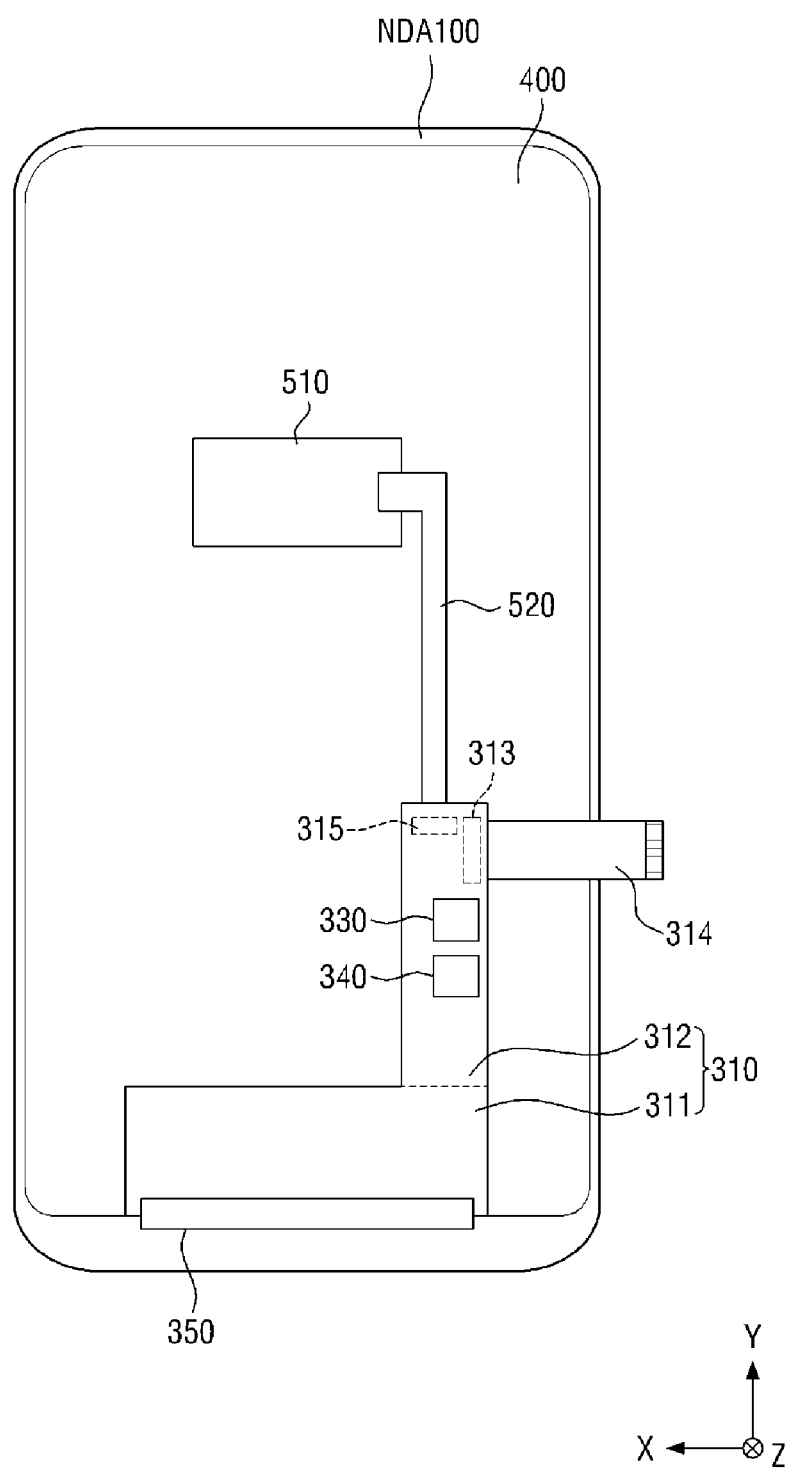
FIG. 3 is a bottom view showing an exemplary embodiment of a display panel attached to a cover window of FIG. 2.
Figure 4A:
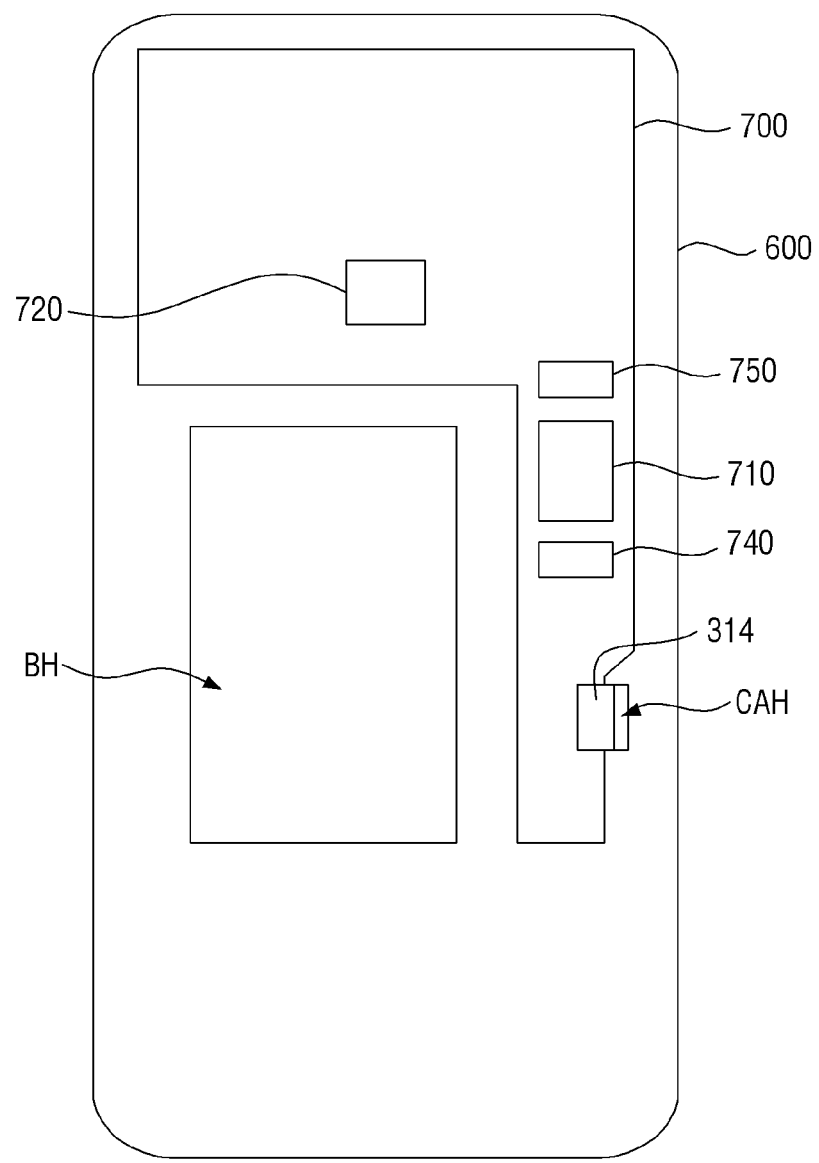
FIG. 4A is a bottom view showing an exemplary embodiment of a middle frame and a main circuit board attached under of the display panel of FIG. 3.
Figure 4B:
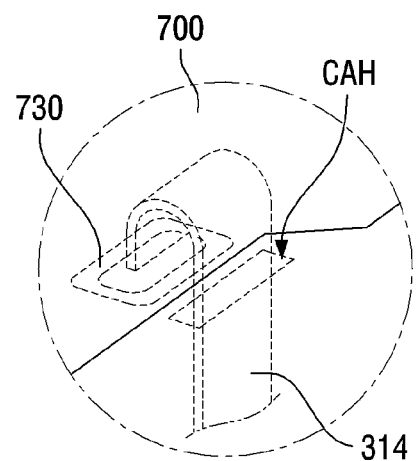
FIG. 4B is an enlarged perspective view of the encircled portion of FIG. 4A.

FIG. 3 is a bottom view showing an exemplary embodiment of a display panel attached to a cover window of FIG. 2. FIG. 4A is a bottom view showing an exemplary embodiment of a middle frame and a main circuit board attached under the display panel of FIG. 3. FIG. 4B is an enlarged perspective view of the encircled portion of FIG. 4A.

Referring to FIGS. 3 and 4, the panel bottom cover 400 may be disposed under the display panel 300. The panel bottom cover 400 may be attached to the lower surface of the display panel 300 by an adhesive member. The adhesive member may be a pressure-sensitive adhesive ("PSA").

The panel bottom cover 400 may include at least one member selected from a light blocking member for absorbing light incident from the outside of the display device 10, a buffer for absorbing external impact, and a heat dissipation member for efficiently dissipating the heat of the display panel 300.

The light blocking member may be disposed under the display panel 300. The light blocking member blocks the passage of light and thereby prevents elements disposed under the light blocking member, for example, the display circuit board 310 and the sound generation device 510, from being visually recognized from above the display panel 300. The light blocking member may include a light-absorbing material, such as a black pigment or dye.

The buffer may be disposed under the light blocking member. The buffer prevents damage to the display panel 300 by absorbing external impact. The buffer may have a single layer structure or a multi-layer structure. In one exemplary embodiment, for example, the buffer may include or be formed of a polymer resin, such as polyurethane, polycarbonate ("PC"), polypropylene, or polyethylene, or may include an elastic material, such as rubber, a urethane-based material, or sponge obtained by foaming an acrylic material. The buffer may be a cushion layer.

The heat dissipation member may be disposed under the buffer. The heat dissipation member may include a first heat dissipation layer including graphite, carbon nanotube or the like, and a second heat dissipation layer including or defined by a thin metal (e.g., copper, nickel, ferrite, or silver) layer which blocks electromagnetic waves and has high thermal conductivity.

In an alternative exemplary embodiment, the panel bottom cover 400 may be omitted. In such an embodiment, elements disposed on the lower surface of the panel bottom cover 400, for example, the display circuit board 310 and the sound generation device 510, may be disposed on the lower surface of the display panel 300 instead of the lower surface of the panel bottom cover 400.

The flexible film 350 attached to one side of the display panel 300 may be bent and disposed under the panel bottom cover 400 as shown in FIG. 3. Therefore, the display circuit board 310 attached to one side of the flexible film 350 may be disposed under the panel bottom cover 400. The display circuit board 310 may be fixed or bonded to the lower surface of the panel bottom cover 400 by a fixing member, such as a screw, or an adhesive member, such as a PSA.

The display circuit board 310 may include a first circuit board 311 and a second circuit board 312. In one exemplary embodiment, for example, the first circuit board 311 and the second circuit board 312 may be rigid printed circuit boards or FPCBs. In an exemplary embodiment, the display circuit board 310 may be a hybrid printed circuit board, in which any one of the first circuit board 311 and the second circuit board 312 may be a rigid printed circuit board and the other may be a FPCB.

FIG. 3 shows an exemplary embodiment in which the second circuit board 312 extends from one side of the first circuit board 311 in the second direction (the Y-axis direction). The width or length of the second circuit board 312 in the first direction (the X-axis direction) may be smaller than that of the first circuit board 311 in the first direction (the X-axis direction).

The touch driving circuit 330 and the sound driving circuit 340 may be disposed on a surface of the second circuit board 312, and a first connector 313 and a second connector 315 may be disposed on an opposite surface. The first connector 313 may include an insertion portion which is connected to a first connection terminal provided at an end of the cable 314. The second connector 315 may include an insertion portion which is connected to a connection terminal provided at an end of a sound circuit board 520.

The first connection terminal provided at the end of the cable 314 may be inserted in the insertion portion of the first connector 313. In an exemplary embodiment, as shown in FIG. 4B, a second connection terminal provided at the other end of the cable 314 may be bent under the main circuit board 700 through the cable hole CAH defined in the bracket 600 and may be inserted in an insertion portion of the main connector 730.

The sound generation device 510 may be disposed on the lower surface of the panel bottom cover 400. The sound generation device 510 may be attached to the lower surface of the panel bottom cover 400 by an adhesive member, such as a PSA. Since the display circuit board 310 is attached to the panel bottom cover 400, the display panel 300 may vibrate in the thickness direction (the Z-axis direction) due to the sound generation device 510.

The connection terminal provided at the end of the sound circuit board 520 may be inserted in the insertion portion of the second connector 315. The opposite end of the sound circuit board 520 may be connected to a first electrode and a second electrode of the sound generation device 510.

Figure 5:
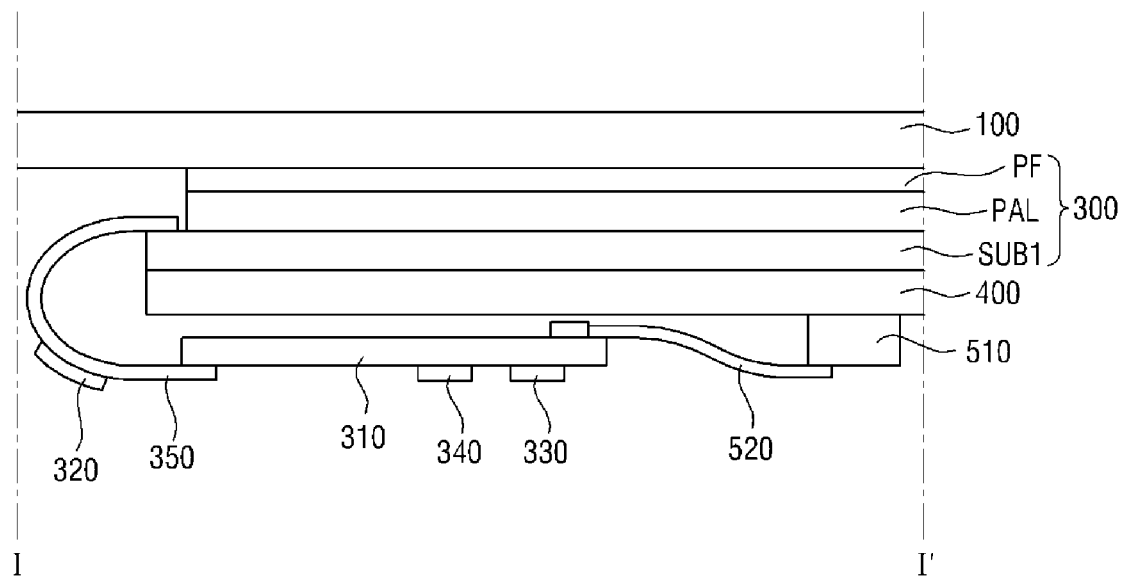
FIG. 5 is a cross-sectional view taken along line I-I' of FIG. 3.

According to an exemplary embodiment shown in FIGS. 3 to 5, the main circuit board 700 and the display circuit board 310 may be electrically connected through the cable 314, and the sound generation device 510 and the display circuit board 310 may be electrically connected through the sound circuit board 520.

FIG. 5 is a cross-sectional view taken along line I-I' of FIG. 3.

Referring to FIG. 5, an exemplary embodiment of the display panel 300 may include a substrate SUB1, a pixel array layer PAL, and a polarizing film PF.

The substrate SUB1 may be a rigid substrate or a flexible substrate which is bendable, foldable or rollable, for example. The substrate SUB1 may include or be formed of an insulating material, such as a glass, quartz, or a polymer resin. In such an embodiment, the polymer resin may be polyethersulfone ("PES"), polyacrylate ("PA"), polyarylate ("PAR"), polyetherimide ("PEI"), polyethylenenaphthalate ("PEN"), polyethyleneterephthalate ("PET"), polyphenylenesulfide ("PPS"), polyallylate, polyimide ("PI"), PC, cellulosetriacetate ("CAT"), cellulose acetate propionate ("CAP"), or a combination thereof. The substrate SUB1 may include a conductive material.

Figure 6:
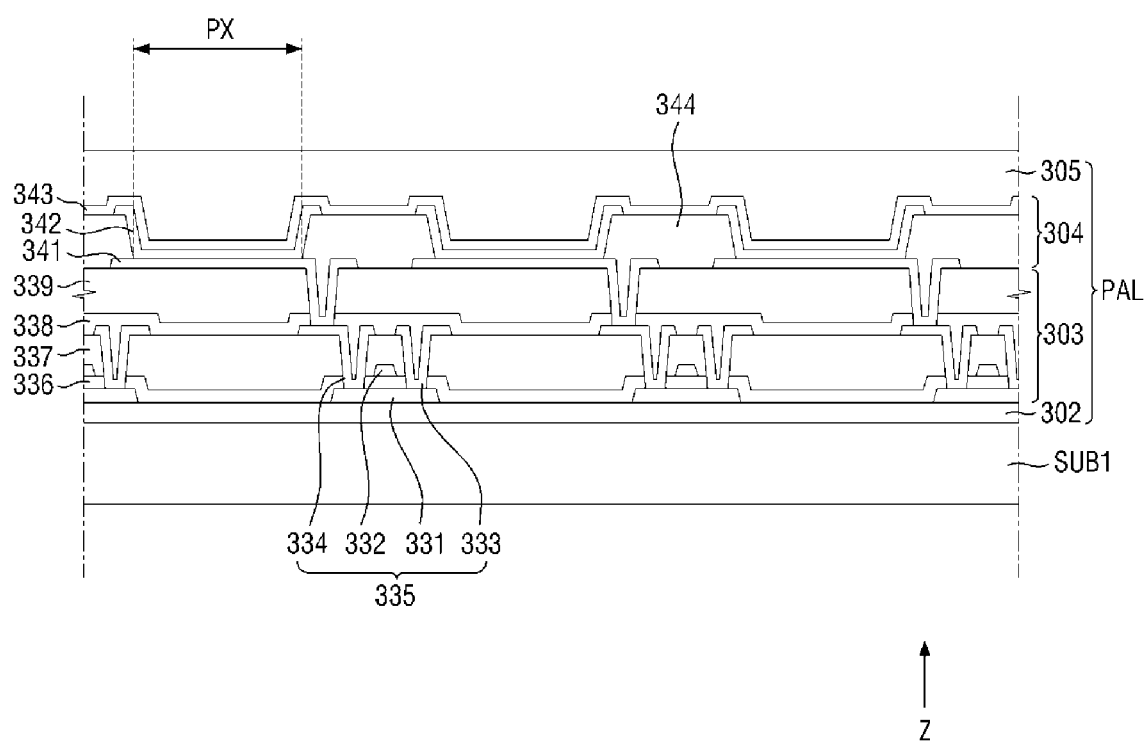
FIG. 6 is a cross-sectional view showing a display region of the display panel of FIG. 5 in detail.

The pixel array layer PAL may be disposed on the substrate SUB1. The pixel array layer PAL may be a layer which includes pixels PX to display an image. In an exemplary embodiment, as shown in FIG. 6, the pixel array layer PAL may include a thin film transistor ("TFT") layer 303, a light-emitting device layer 304, and a thin film package (or encapsulation) layer 305.

In an exemplary embodiment, the polarizing film PF may be disposed on the pixel array layer PAL to prevent degradation of visibility caused by reflection of external light. The polarizing film PF may include a linear polarizing film and a phase retardation film, such as a λ/4 (quarter-wave) plate. In one exemplary embodiment, for example, the phase retardation film may be disposed on the pixel array layer PAL, and the linear polarizing film may be interposed between the phase retardation film and the cover window 100.

In an exemplary embodiment, as shown in FIG. 5, the panel bottom cover 400 may be disposed on a surface of the display panel 300, and the cover window 100 may be disposed on an opposite surface which is opposite to the surface of the display panel 300. In such an embodiment, the panel bottom cover 400 may be disposed on the lower surface of the substrate SUB1 of the display panel 300, and the cover window 100 may be disposed on the upper surface of the polarizing film PF.

One side of the flexible film 350 may be attached to one side of the substrate SUB1, and the opposite side may be attached to one side of the display circuit board 310. The side of the flexible film 350 may be attached to a surface of the substrate SUB1 using an anisotropic conductive film. The opposite side of the flexible film 350 may be attached to a surface of the display circuit board 310 using an anisotropic conductive film. An opposite surface of the display circuit board 310, which is opposite to the surface thereof attached to the flexible film 350, may face the panel bottom cover 400.

Although FIG. 5 shows an exemplary embodiment in which the display driver circuit 320 is disposed on a surface of the flexible film 350, the disclosure is not limited thereto. The display driver circuit 320 may be disposed on an opposite surface of the flexible film 350, which is attached to the surface of the substrate SUB1 and the surface of the display circuit board 310.

In an exemplary embodiment, the display circuit board 310 may be disposed on the lower surface of the panel bottom cover 400. The display circuit board 310 may be fixed or bonded to the lower surface of the panel bottom cover 400 by a fixing member, such as a screw, or an adhesive member, such as a PSA.

The touch driving circuit 330 and the sound circuit board 520 may be disposed on a surface of the display circuit board 310. The first connector 313 and the second connector 315 may be disposed on the opposite surface of the display circuit board 310.

A surface of the sound generation device 510 may be disposed on a surface of the panel bottom cover 400, and the sound circuit board 520 may be attached onto an opposite surface of the sound generation device 510. In one exemplary embodiment, for example, the upper surface of the sound generation device 510 may be attached onto the lower surface of the panel bottom cover 400 using an adhesive member, such as a PSA. In an exemplary embodiment, if the sound generation device 510 is disposed on the heat dissipation member of the panel bottom cover 400, the first heat dissipation layer may be broken by vibrations of the sound generation device 510. Therefore, in such an embodiment, a hole may be defined through the heat dissipation member at a region in which the sound generation device 510 is disposed, and the sound generation device 510 may be attached onto the lower surface of the buffer. Alternatively, a hole may be defined through the buffer and the heat dissipation member at the region in which the sound generation device 510 is disposed, and the sound generation device 510 may be attached onto the lower surface of the light blocking member.

The sound circuit board 520 may be attached onto the lower surface of the sound generation device 510 using an anisotropic conductive film. Lead lines of the sound circuit board 520 may be electrically connected to the first electrode and the second electrode of the sound generation device 510, respectively. The connection terminal provided at an end of the sound circuit board 520 may be connected to the lead lines. The connection terminal of the sound circuit board 520 may be inserted in the insertion portion of the second connector 315. The sound circuit board 520 may be an FPCB or a flexible film.

According to an exemplary embodiment shown in FIG. 5, the sound generation device 510 may be fixed on the display panel 300 through an adhesive member and connected to the second connector 315 of the display circuit board 310 through the sound circuit board 520. Therefore, the sound generation device 510 may be electrically connected to the sound driving circuit 340 of the display circuit board 310.

FIG. 6 is a cross-sectional view showing a display region of the display panel of FIG. 5 in detail.

Referring to FIG. 6, an exemplary embodiment of the display panel 300 may include the substrate SUB1 and the pixel array layer PAL. In an exemplary embodiment, as shown in FIG. 6, the pixel array layer PAL may include the TFT layer 303, the light-emitting device layer 304, and the thin film package layer 305.

A buffer layer 302 may be disposed on the substrate SUB1. The buffer layer 302 may be disposed on the substrate SUB1 to protect TFTs 335 and light-emitting elements from moisture penetrating through the substrate SUB1 which is vulnerable to moisture penetration. The buffer layer 302 may be formed by alternately stacking a plurality of inorganic layers. In one exemplary embodiment, for example, the buffer layer 302 may have a multi-layer structure which are obtained by alternately stacking one or more inorganic layers among a silicon oxide layer (SiOx), a silicon nitride layer (SiNx), and SiON. Alternatively, the buffer layer 302 may be omitted.

The TFT layer 303 may be disposed on the buffer layer 302. The TFT layer 303 includes the TFTs 335, a gate insulating layer 336, an interlayer insulating layer 337, a protection layer 338, and a planarization layer 339.

Each of the TFTs 335 includes an active layer 331, a gate electrode 332, a source electrode 333, and a drain electrode 334. Although FIG. 6 shows an exemplary embodiment of the TFTs 335 in which the gate electrode 332 is on the active layer 331 in a top gate structure, but the disclosure is not limited thereto. In an alternative exemplary embodiment, the TFTs 335 may be in a bottom gate structure in which the gate electrode 332 is disposed under the active layer 331 or in a double gate structure in which the gate electrode 332 is disposed both on and under the active layer 331.

The active layer 331 is disposed on the buffer layer 302. The active layer 331 may include or be formed of a silicon-based semiconductor material or an oxide-based semiconductor material. A light-shielding layer may be disposed between the buffer layer 302 and the active layer 331 to block external light incident to the active layer 331.

The gate insulating layer 336 may be disposed on the active layer 331. The gate insulating layer 336 may include or be formed of an inorganic layer, such as a silicon oxide layer (SiOx), a silicon nitride layer (SiNx), or multiple layers thereof.

The gate electrode 332 and a gate line may be disposed on the gate insulating layer 316. The gate electrode 332 and the gate line may have a single layer structure or a multi-layer structure, each layer including or made of at least one material selected from molybdenum (Mo), aluminum (Al), chrome (Cr), *aurum* (Au), titanium (Ti), nickel (Ni), neodymium (Nd), copper (Cu) and a combination (e.g., an alloy) thereof.

The interlayer insulating layer 337 may be disposed on the gate electrode 332 and the gate line. The interlayer insulating layer 337 may include or be formed of an inorganic layer, such as a silicon oxide layer (SiOx), a silicon nitride layer (SiNx), or multiple layers thereof.

In an exemplary embodiment, the source electrode 333, the drain electrode 334, and a data line may be disposed on the interlayer insulating layer 337. Each of the source electrode 333 and the drain electrode 334 may be coupled to the active layer 331 through contact holes defined through the gate insulating layer 336 and the interlayer insulating layer 337. The source electrode 333, the drain electrode 334, and the data line may have a single layer structure or a multi-layer structure, each layer including or made of any one of Mo, Al, Cr, Au, Ti, Ni, Nd, and Cu or an alloy thereof.

The protection layer 338 may be disposed on the source electrode 333, the drain electrode 334, and the data line to insulate the TFT 335. The protection layer 338 may include or be formed of an inorganic layer, such as a silicon oxide layer (SiOx), a silicon nitride layer (SiNx), or multiple layers thereof.

The planarization layer 339 may be disposed on the protection layer 338 to planarize the step structure formed by the TFT 335 thereunder. The planarization layer 339 may include or be formed of an organic layer of an acryl resin, an epoxy resin, a phenolic resin, a polyamide resin, a PI resin, or the like.

The light-emitting device layer 304 is disposed on the TFT layer 303. The light-emitting device layer 304 includes light-emitting elements and a pixel defining layer 344.

The light-emitting elements and the pixel defining layer 344 are disposed on the planarization layer 339. In an exemplary embodiment, the light-emitting elements may be organic light-emitting devices including an anode electrode 341, a light-emitting layer 342, and a cathode electrode 343.

The anode electrode 341 may be disposed on the planarization layer 339. The anode electrode 341 may be coupled to the source electrode 333 of the TFT 335 through a contact hole defined through the protection layer 338 and the planarization layer 339.

In an exemplary embodiment, the pixel defining layers 344 may be disposed to cover the edges of the anode electrodes 341 on the planarization layer 339 so that pixels may be separated from one another. In such an embodiment, the pixel defining layer 344 serves to define pixels. Each pixel indicates a region in which the anode electrode 341, the light-emitting layer 342, and the cathode electrode 343 are sequentially stacked and holes from the anode electrode 341 and electrons from the cathode electrode 343 are combined together in the light-emitting layer 342 to emit light.

The light-emitting layers 342 are disposed on the anode electrodes 341 and the pixel defining layer 344. The light-emitting layers 342 may be organic light-emitting layers. The light-emitting layers 342 may emit one of red light, green light, and blue light. Alternatively, the light-emitting layers 342 may be white light-emitting layers which emit white light. In such an embodiment, the light-emitting layers 342 may have a structure in which a red light-emitting layer, a green light-emitting layer, and a blue light-emitting layer are stacked and may be common layers which are included in the pixels in common. In such an embodiment, the display panel 300 may additionally include a color filter for displaying red, green, and blue colors.

The light-emitting layer 342 may include a hole transporting layer, a light-emitting layer, and an electron transporting layer. In an exemplary embodiment, the light-emitting layer 342 may be in a tandem structure of two or more stacks. In such an embodiment, a charge generation layer may be disposed between the stacks.

The cathode electrode 343 is disposed on the light-emitting layer 342. The cathode electrode 343 may be disposed to cover the light-emitting layer 342. The cathode electrode 343 may be a common layer which is included in the pixels in common.

In an exemplary embodiment, where the light-emitting device layer 304 is formed in a top emission manner in which light is emitted upward, the anode electrode 341 may include or be formed of a conductive material with high reflectance, such as a laminated structure of aluminum and titanium (Ti/Al/Ti), a laminated structure of aluminum and indium tin oxide ("ITO") (ITO/Al/ITO), an Ag—Pd—Cu ("APC") alloy, or a laminated structure of an APC alloy and ITO (ITO/APC/ITO). An APC alloy is an alloy of silver (Ag), palladium (Pd), and copper (Cu). Also, the cathode electrode 343 may be formed of a transparent conductive material ("TCO"), such as ITO or indium zinc oxide ("IZO"), which is able to transmit light, or a semi-transmissive conductive material, such as Mg, Ag, or an alloy of Mg and Ag. In an exemplary embodiment, where the cathode electrode 343 include or is formed of a semi-transmissive conductive material, light emission efficiency may be improved by a micro-cavity effect.

In an exemplary embodiment, where the light-emitting device layer 304 is formed in a bottom emission manner in which light is emitted downward, the anode electrode 341 may include or be formed of a semi-transmissive conductive material, such as Mg, Ag, or an alloy of Mg and Ag. The cathode electrode 343 may include or be formed of a conductive material with high reflectance, such as a laminated structure of aluminum and titanium (Ti/Al/Ti), a laminated structure of aluminum and ITO (ITO/Al/ITO), an APC alloy, or a laminated structure of an APC alloy and ITO (ITO/APC/ITO). In an exemplary embodiment, where the anode electrode 341 include or is formed of a semi-transmissive conductive material, light emission efficiency may be improved by a micro-cavity effect.

The thin film package layer 305 is disposed on the light-emitting device layer 304. The thin film package layer 305 serves to prevent oxygen or moisture from penetrating into the light-emitting layer 342 and the cathode electrode 343. In such an embodiment, the thin film package layer 305 may include at least one inorganic layer. The inorganic layer may include or be formed of a silicon oxide, an aluminum oxide, a zirconium nitride, a titanium nitride, a hafnium nitride, a tantalum nitride, a silicon oxide, an aluminum oxide, or a titanium oxide. In an exemplary embodiment, the thin film package layer 305 may include at least one organic layer. The organic layer may have a sufficient thickness to prevent particles from penetrating the thin film package layer 305 and infiltrating into the light-emitting layer 342 and the cathode electrode 343. The organic layer may include at least one material selected from epoxy, acrylate, and urethane acrylate.

A touch sensor layer (not shown) may be disposed on the thin film package layer 305. In an exemplary embodiment, the touch sensor layer is disposed directly on the thin film package layer 305, such that the thickness of the display device 10 may be reduced.

The touch sensor layer may include electrodes for sensing a user's touch in a capacitive manner and touch lines which connect pads to the touch electrodes. In one exemplary embodiment, for example, the touch sensor layer may sense a user's touch in a self-capacitance manner or a mutual capacitance manner.

Figure 7:
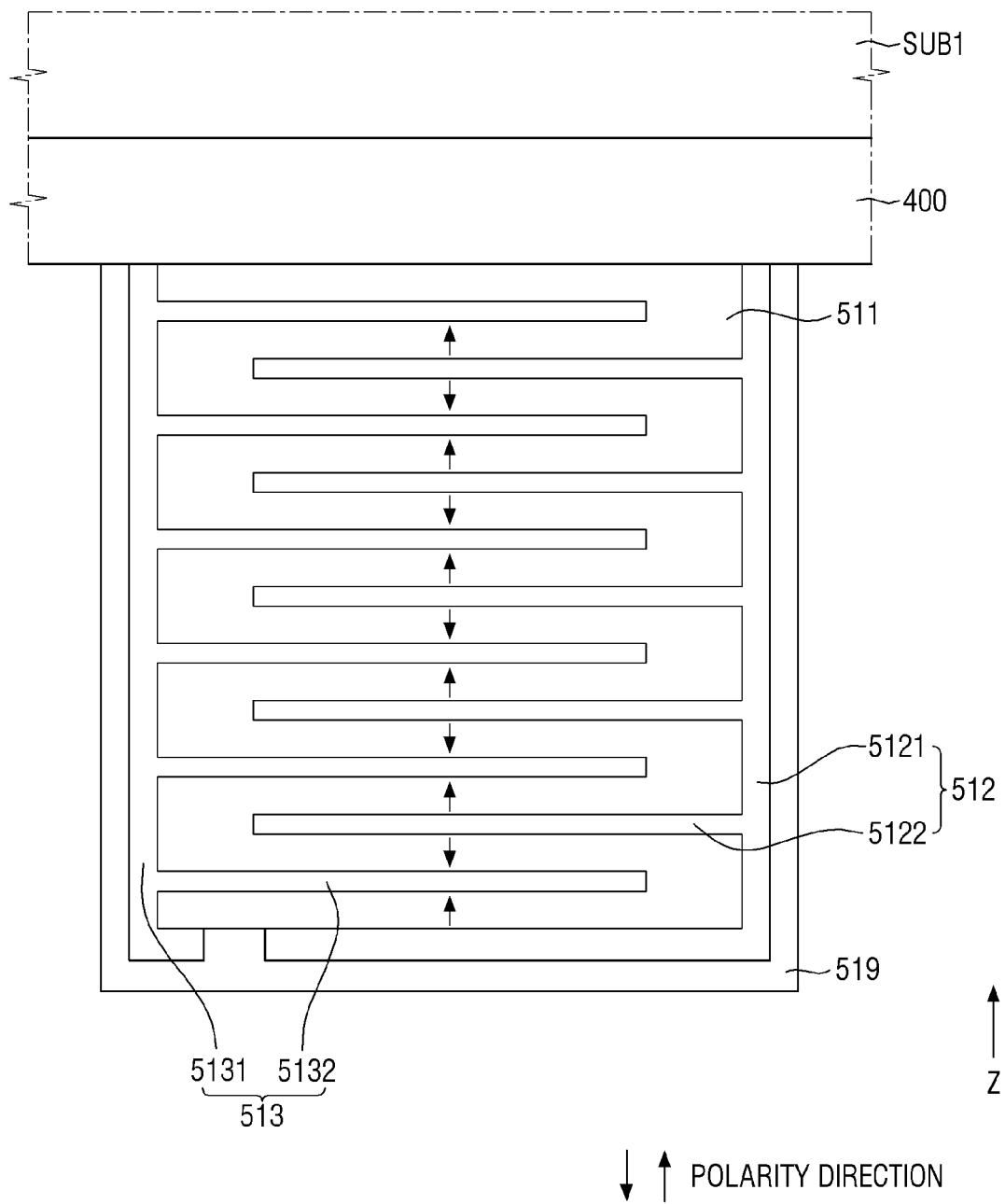
FIG. 7 is a cross-sectional view showing an exemplary embodiment of a sound generation device of FIG. 5.
Figure 8:
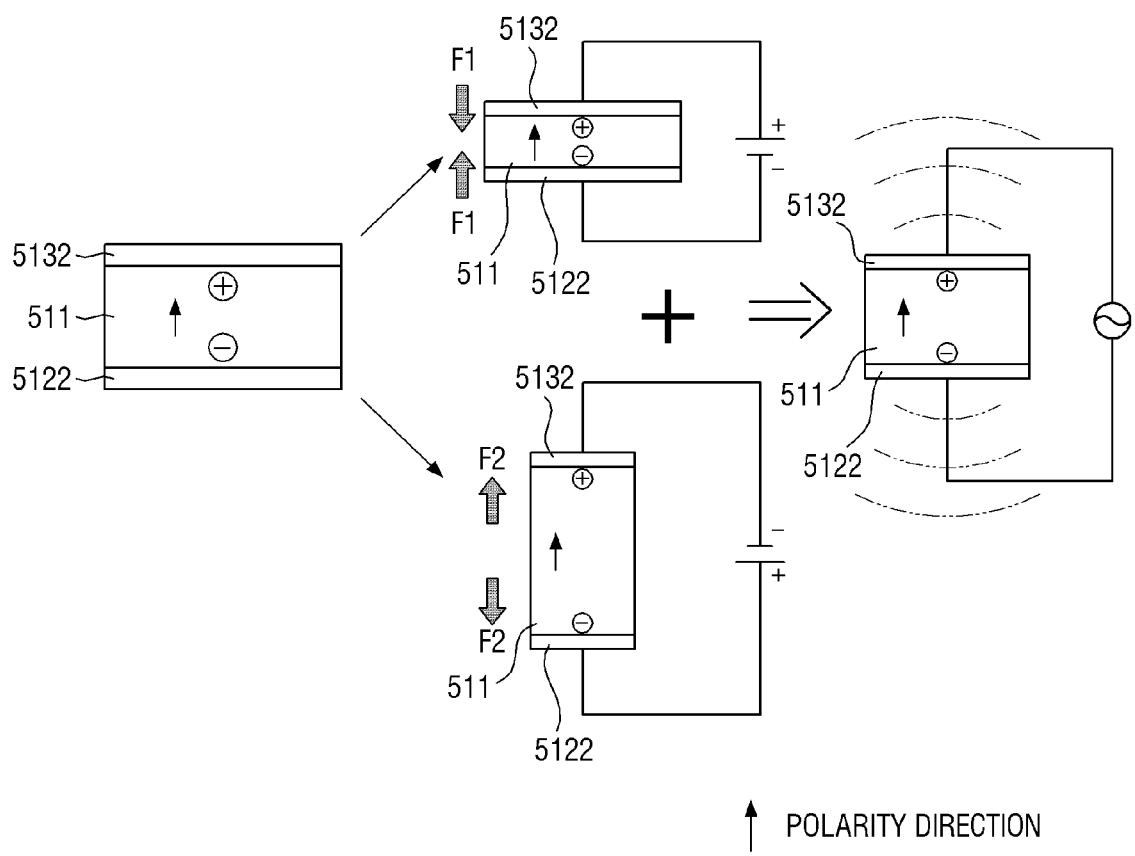
FIG. 8 is a diagram showing a vibration method of a vibration layer interposed between a first branch electrode and a second branch electrode of a sound generation device.

FIG. 7 is a cross-sectional view showing an exemplary embodiment of a sound generation device of FIG. 5. FIG. 8 is a diagram showing a vibration method of a vibration layer interposed between a first branch electrode and a second branch electrode of a sound generation device.

Referring to FIGS. 7 and 8, the sound generation device 510 may be a piezoelectric element or a piezoelectric actuator which vibrates the display panel 300 using a piezoelectric material that contracts or expands by an applied voltage. The sound generation device 510 may include a vibration layer 511, a first electrode 512, and a second electrode 513.

The first electrode 512 may include a first stem electrode 5121 and first branch electrodes 5122. As shown in FIG. 7, the first stem electrode 5121 may be disposed on at least one side surface of the vibration layer 511. Alternatively, the first stem electrode 5121 may be disposed through a part of the vibration layer 511. The first stem electrode 5121 may be disposed on the upper surface of the vibration layer 511. The first branch electrodes 5122 may branch from the first stem electrode 5121. The first branch electrodes 5122 may be disposed in parallel with each other.

The second electrode 513 may include a second stem electrode 5131 and second branch electrodes 5132. The second electrodes 513 may be disposed apart from the first electrode 512, such that the second electrode 513 may be electrically separated from the first electrode 512. The second stem electrode 5131 may be disposed on at least one side surface of the vibration layer 511. In an exemplary embodiment, the first stem electrode 5121 may be disposed on a first side surface of the vibration layer 511, and the second stem electrode 5131 may be disposed on a second side surface of the vibration layer 511. Alternatively, the second stem electrode 5131 may be disposed through a part of the vibration layer 511. The second stem electrode 5131 may be disposed on the upper surface of the vibration layer 511. The second branch electrodes 5132 may branch from the second stem electrode 5131. The second branch electrodes 5132 may be disposed in parallel with each other.

The first branch electrodes 5122 and the second branch electrodes 5132 may be arranged in parallel with each other in a horizontal direction (the X-axis direction or the Y-axis direction). Also, the first branch electrodes 5122 and the second branch electrodes 5132 may be alternately arranged in a vertical direction (the Z-axis direction). In such an embodiment, the first branch electrodes 5122 and the second branch electrodes 5132 may be repeatedly arranged in the vertical direction (the Z-axis direction) in order of a first branch electrode 5122, a second branch electrode 5132, a first branch electrode 5122, and a second branch electrode 5132.

The first electrode 512 and the second electrode 513 may be connected to pads of the sound circuit board 520. The pads of the sound circuit board 520 may be connected to the first electrode 512 and the second electrode 513 disposed on one surface of the sound generation device 510.

The vibration layer 511 may be a piezoelectric element which is deformed according to a driving voltage applied to the first electrode 512 and a driving voltage applied to the second electrode 513. In an exemplary embodiment, the vibration layer 511 may include at least one selected from a polyvinylidene fluoride ("PVDF") film, a piezoelectric material, such as a plumbum zirconate-titanate ("PZT"), and an electroactive polymer.

Since the fabrication temperature of the vibration layer 511 is high, the first electrode 512 and the second electrode 513 may include or be formed of silver (Ag) having a high melting point or an alloy of silver (Ag) and palladium (Pd). In such an embodiment, where the first electrode 512 and the second electrode 513 are formed of an alloy of silver (Ag) and palladium (Pd), the content of silver (Ag) may be higher than that of palladium (Pd) to raise the melting point of the first electrode 512 and the second electrode 513.

The vibration layer 511 may be interposed between each pair of a first branch electrode 5122 and a second branch electrode 5132. The vibration layer 511 contracts or expands based on the difference between a driving voltage applied to the first branch electrodes 5122 and a driving voltage applied to the second branch electrodes 5132.

As shown in FIG. 7, when the polarity direction of the vibration layer 511 interposed between a first branch electrodes 5122 and a second branch electrode 5132 disposed below the first branch electrode 5122 is the downward direction the vibration layer 511 has the negative polarity in an upper region adjacent to the first branch electrode 5122 and has the positive polarity in a lower region adjacent to the second branch electrode 5132. Also, when the polarity direction of the vibration layer 511 interposed between a second branch electrode 5132 and a first branch electrodes 5122 disposed below the second branch electrode 5132 is the upward direction ↑, the vibration layer 511 has the positive polarity in an upper region adjacent to the second branch electrode 5132 and has the negative polarity in a lower region adjacent to the first branch electrode 5122. The polarity directions of the vibration layer 511 may be determined by a poling process of applying an electric field to the vibration layer 511 using the first branch electrodes 5122 and the second branch electrodes 5132.

As shown in FIG. 8, the polarity direction of the vibration layer 511 interposed between a first branch electrode 5122 and a second branch electrode 5132 disposed upper the first branch electrode 5122 may be the upward direction ↑. In this case, when a driving voltage of the negative polarity is applied to the first branch electrode 5122 and a driving voltage of the positive polarity is applied to the second branch electrode 5132, the vibration layer 511 may contract due to a first force F1. The first force F1 may be a contractile force. Also, when a driving voltage of the positive polarity is applied to the first branch electrode 5122 and a driving voltage of the negative polarity is applied to the second branch electrode 5132, the vibration layer 511 may expand due to a second force F2. The second force F2 may be an expansion force.

As shown in FIG. 8, the polarity direction of the vibration layer 511 interposed between a second branch electrode 5132 and a first branch electrode 5122 disposed upper the second branch electrode 5132 may be the downward direction ↓. In this case, when a driving voltage of the positive polarity is applied to the second branch electrode 5132 and a driving voltage of the negative polarity is applied to the first branch electrode 5122, the vibration layer 511 may expand due to an expansion force. Also, when a driving voltage of the negative polarity is applied to the second branch electrode 5132 and a driving voltage of the positive polarity is applied to the first branch electrode 5122, the vibration layer 511 may contract due to a contractile force.

When a driving voltage applied to the first electrode 512 and a driving voltage applied to the second electrode 513 repeatedly or alternately changes from the positive polarity to the negative polarity, or vice versa, the vibration layer 511 repeatedly contracts and expands. Accordingly, the sound generation device 510 vibrates. Since the sound generation device 510 is disposed on one surface of a heat dissipation film 130, when the vibration layer 511 of the sound generation device 510 contracts and expands, the display panel 300 vibrates in a third direction (the Z-axis direction), which is the thickness direction of the display panel 300, due to stress.

In an exemplary embodiment, as shown in FIG. 7, a protection layer 519 may be additionally disposed on a second surface and side surfaces of the sound generation device 510. The protection layer 519 may include or be formed of an insulating material or the same material as the vibration layer 511. The protection layer 519 may be disposed on the first electrode 512, the second electrode 513, and a portion of the vibration layer 511 which is exposed without being covered by the first electrode 512 and the second electrode 513. The protection layer 519 may be disposed to surround the first electrode 512, the second electrode 513, and the portion of the vibration layer 511 which is exposed without being covered by the first electrode 512 and the second electrode 513. Accordingly, in such an embodiment, the vibration layer 511, the first electrode 512, and the second electrode 513 of the sound generation device 510 may be protected by the protection layer 519. Alternatively, the protection layer 519 may be omitted.

Figure 9:
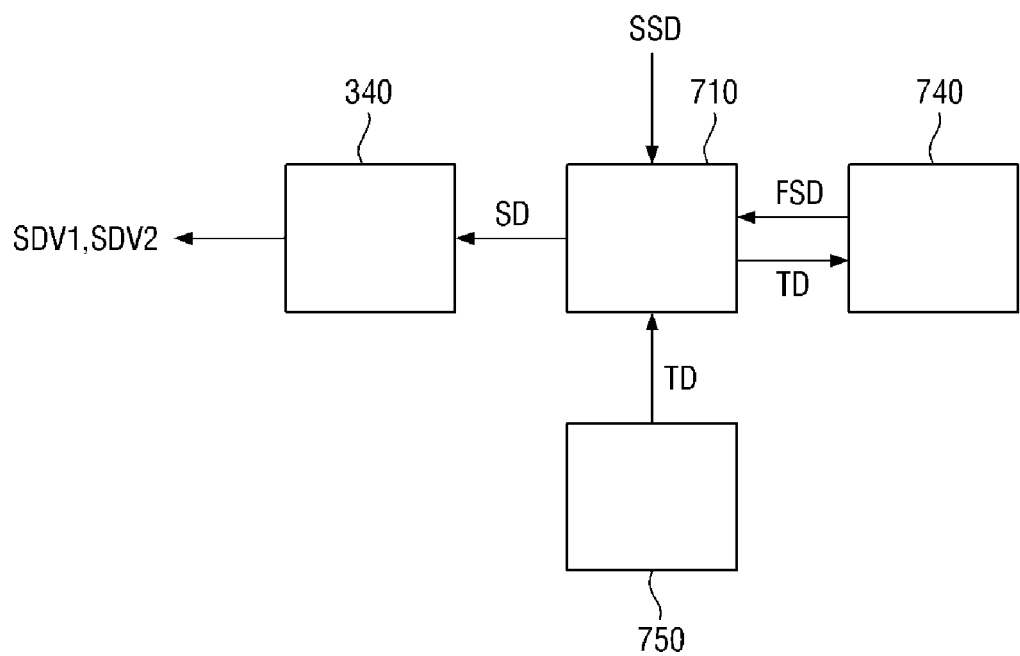
FIG. 9 is a block diagram showing a sound driving circuit of a display circuit board and a main processor, a temperature sensor, and a memory of a main circuit board according to an exemplary embodiment of the disclosure.

FIG. 9 is a block diagram showing a sound driving circuit of a display circuit board and a main processor, a temperature sensor, and a memory of a main circuit board according to an exemplary embodiment of the disclosure.

Referring to FIG. 9, in an exemplary embodiment, the main processor 710 receives temperature data TD from the temperature sensor 750 every predetermined time period or with predetermined time interval. The main processor 710 outputs the temperature data TD to the memory 740 and receives sound driving voltage data FSD from the memory 740. When the temperature of or temperature value in the temperature data TD is changed, the main processor 710 may output the temperature data TD to the memory 740 and receive the sound driving voltage data FSD from the memory 740. When a temperature range in the memory 740 in which the temperature of the temperature data TD is included is changed, the main processor 710 may output the temperature data TD to the memory 740 and receive the sound driving voltage data FSD from the memory 740.

The main processor 710 may generate sound data SD using sound source data SSD and the sound driving voltage data FSD. The sound source data SSD may be a sound signal or a video call signal input through the mobile communication module. Alternatively, the sound source data SSD may be a sound signal stored in a non-volatile memory, such as a flash memory of the display device 10. The main processor 710 outputs the sound data SD to the sound driving circuit 340 of the display circuit board 310 through the cable 314.

Figure 10:
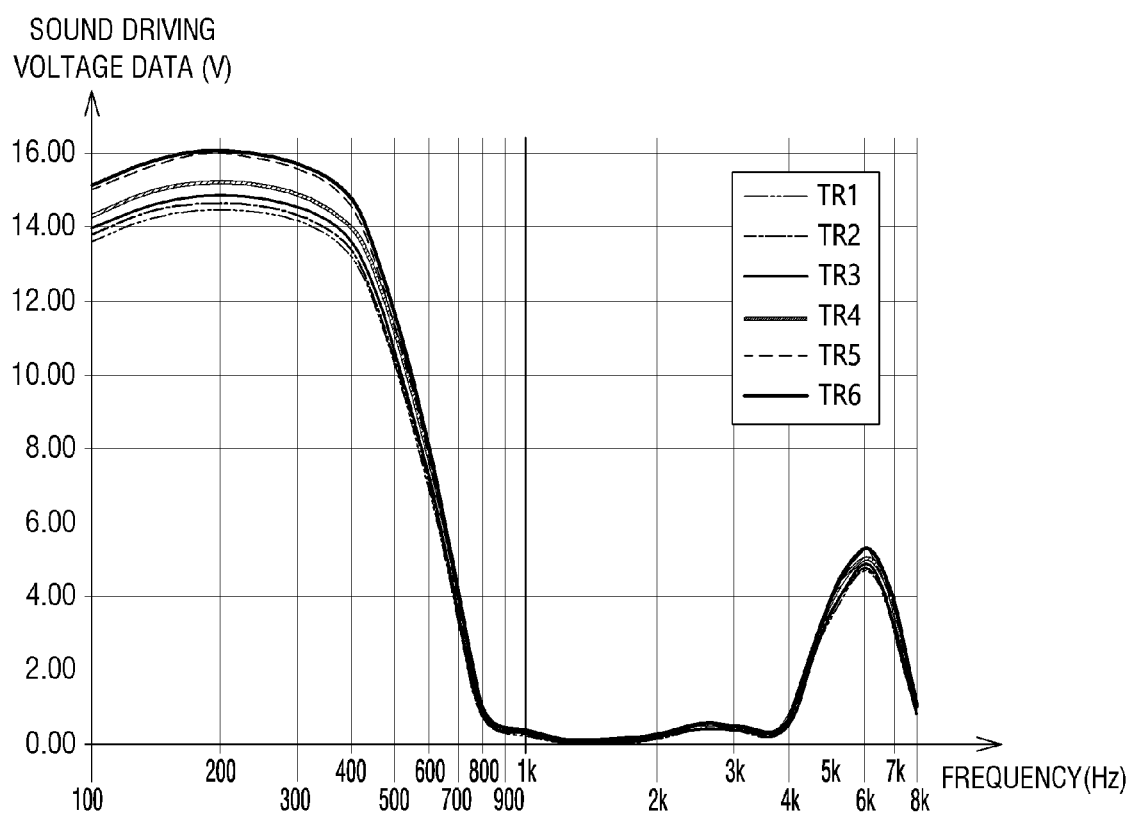
FIG. 10 is a graph showing sound driving voltages dependent on temperatures stored in a memory according to an exemplary embodiment of the disclosure.

The memory 740 stores sound driving voltage data corresponding to a plurality of temperature ranges, respectively. In an exemplary embodiment, as shown in FIG. 10, the plurality of temperature ranges may include first to sixth temperature ranges TR1, TR2, TR3, TR4, TR5, and TR6. The first temperature range TR1 indicates that the temperature of the temperature data TD is 80° C. or higher, and the second temperature range TR2 indicates that the temperature of the temperature data TD is higher than or equal to 50° C. and lower than 80° C. The third temperature range TR3 indicates that the temperature of the temperature data TD is higher than or equal to 30° C. and lower than 50° C., and the fourth temperature range TR4 indicates that the temperature of the temperature data TD is higher than or equal to 0° C. and lower than 30° C. The fifth temperature range TR5 indicates that the temperature of the temperature data TD is higher than or equal to −20° C. and lower than 0° C., and the sixth temperature range TR6 indicates that the temperature of the temperature data TD is lower than −20° C.

In the memory 740, sound driving voltage data corresponding to a plurality of specific frequencies is stored. At each of the plurality of specific frequencies, sound driving voltage data may vary according to the plurality of temperature ranges. At each of the plurality of specific frequencies, the value of sound driving voltage data may become higher as the temperature range becomes lower. In one exemplary embodiment, for example, at 200 hertz (Hz), the value of the sound driving voltage data FSD may be the highest in the sixth temperature range TR6, the second highest in the fifth temperature range TR5, the third highest in the fourth temperature range TR4, the fourth highest in the third temperature range TR3, the fifth highest in the second temperature range TR2, and the lowest in the first temperature range TR1 as shown in FIG. 10.

Figure 11:
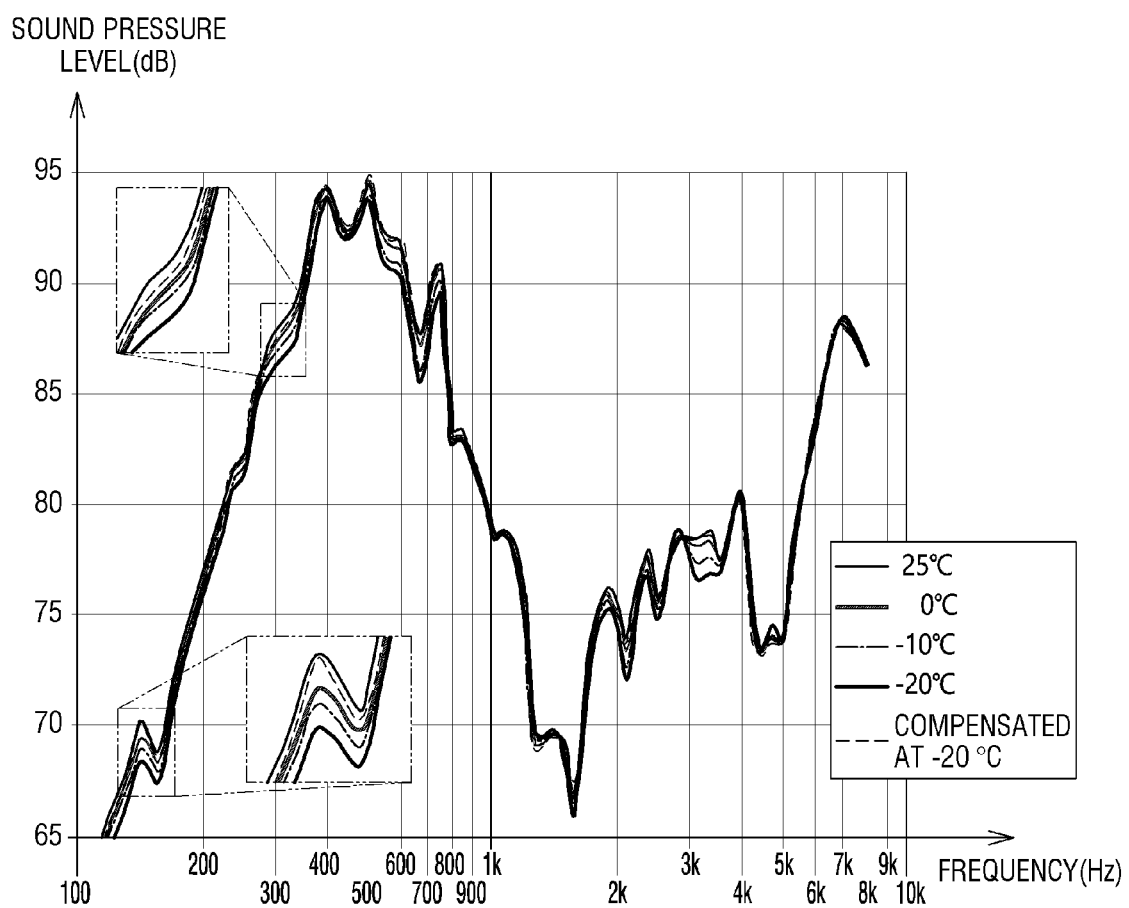
FIG. 11 is a graph showing the sound pressure level at temperatures of 25° C., 0° C., −10° C., and −20° C. and a compensated sound pressure level at a temperature of −20° C.

FIG. 11 shows the sound pressure level of sound which is output by the sound generation device 510 vibrating the display panel 300 at temperatures of 25° C., 0° C., −10° C., and −20° C. As shown in FIG. 11, the sound pressure level of sound output by the sound generation device 510 vibrating the display panel 300 may be lower as the temperature is lower. In one exemplary embodiment, for example, in the frequency domain between 100 Hz and 200 Hz, the frequency domain between 300 Hz and 400 Hz, and the frequency domain between 500 Hz and 800 Hz, there is a large difference of about 2 dB to 3 dB in the sound pressure level of sound between a case in which the temperature is 25° C. and a case in which the temperature is −20° C.

Therefore, to compensate for the sound pressure level of sound which is lowered as the temperature is lowered in a frequency domain of a first frequency or lower, the maximum difference between sound driving voltage data of one of a plurality of temperature ranges and sound driving voltage data of another of the plurality of temperature ranges in the frequency domain of the first frequency or lower may be greater than the maximum difference between sound driving voltage data of the one of the plurality of temperature ranges and sound driving voltage data of the other of the plurality of temperature ranges in a frequency domain of a higher frequency than the first frequency. The first frequency may be about 800 Hz. In one exemplary embodiment, for example, the maximum difference between sound driving voltage data of the first temperature range TR1 and sound driving voltage data of the second temperature range TR2 in the frequency domain of the first frequency or lower may be greater than the maximum difference between sound driving voltage data of the first temperature range TR1 and sound driving voltage data of the second temperature range TR2 in a frequency domain of a higher frequency than the first frequency.

Also, as shown in FIG. 11, there is almost no difference between the sound pressure level of sound output by the sound generation device 510 vibrating the display panel 300 on the basis of sound driving voltage data stored in the sixth temperature range TR6 of the memory 740 when the temperature is −20° C. and the sound pressure level of sound output by the sound generation device 510 vibrating the display panel 300 when the temperature is 25° C. In other words, the memory 740 stores the sound driving voltage data FSD, which is compensated or converted based on the temperature, and selects and outputs the sound driving voltage data FSD according to a temperature range including the temperature of the temperature data TD. Therefore, in such an embodiment, the sound generation device 510 is operated based on the sound data SD which is generated using the selected sound driving voltage data FSD, such that a difference in the sound pressure level of sound output by the sound generation device 510 vibrating the display panel 300 due to a temperature change may be effectively compensated.

The temperature sensor 750 senses an ambient temperature, converts the sensed temperature into the temperature data TD which is digital data, and outputs the temperature data TD to the main processor 710. The temperature sensor 750 may output the temperature data TD to the main processor 710 at predetermined time periods or every predetermined time interval. Alternatively, the temperature sensor 750 may output the temperature data TD to the main processor only when the temperature is changed.

The sound driving circuit 340 receives the sound data SD from the main processor 710. The sound driving circuit 340 generates sound driving voltages based on the sound data SD and outputs the sound driving voltages to the sound generation device 510. The sound driving voltages may include a first drive voltage SDV1 and a second drive voltage SDV2. The first drive voltage SDV1 and the second drive voltage SDV2 may be respectively applied to the first electrode 512 and the second electrode 513 of the sound generation device 510 through the sound circuit board 520. The sound generation device 510 may contract or expand in response to the first drive voltage SDV1 and the second drive voltage SDV2 and output sound by vibrating the display panel 300.

The sound driving circuit 340 may include a digital signal processor ("DSP") for processing sound data which is a digital signal, a digital-analog converter ("DAC") for converting the sound data output from the DSP into sound driving voltages which are analog signals, an amplifier ("AMP") for amplifying the sound driving voltages and outputting the amplified sound driving voltages, and the like.

According to an exemplary embodiment shown in FIG. 9, the sound driving voltage data FSD is selected from the memory 740 based on temperature data of the temperature sensor 750, and the sound data SD is generated based on the selected sound driving voltage data FSD and output to the sound driving circuit 340. Accordingly, the sound driving circuit 340 may generate sound driving voltages corresponding to the sound data SD which is compensated based on the temperature, and output the sound driving voltages to the sound generation device 510. Therefore, it is possible to reduce or compensate a difference in the sound pressure level of sound, which is output by the sound generation device 510, caused by a temperature change of the sound generation device 510.

Figure 12:
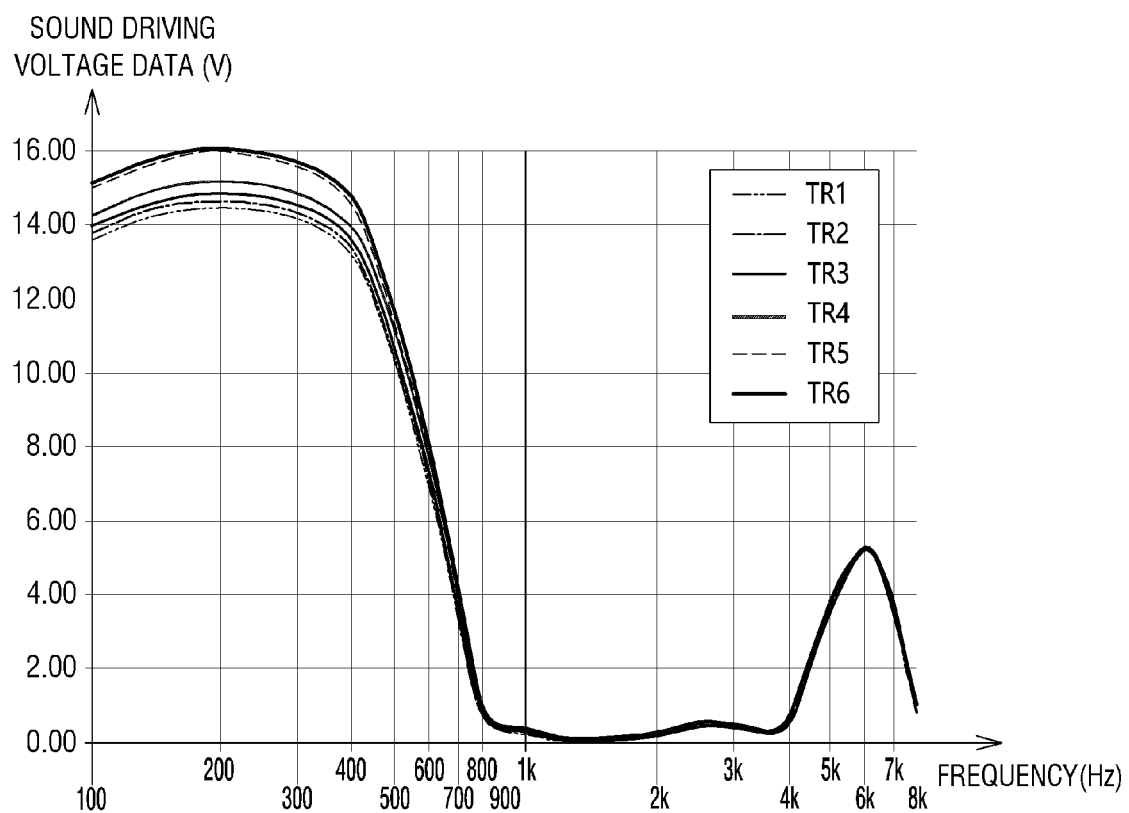
FIG. 12 is a graph showing sound driving voltages corresponding to temperatures stored in a memory according to an exemplary embodiment of the disclosure.

FIG. 12 is a graph showing sound driving voltages corresponding to temperatures stored in a memory according to an exemplary embodiment of the disclosure.

As shown in FIG. 12, when the frequency is 1 kilohertz (kHz) or higher, the sound driving voltage data FSD does not significantly vary according to the temperature. in an exemplary embodiment, where the sound generation device 510 is a piezoelectric element or a piezoelectric actuator which vibrates the display panel 300 using a piezoelectric material that contracts or expands based on an applied voltage, sound in a frequency band of 2 kHz or higher is an ultrasonic wave and does not have significant influence on a user. Therefore, the memory 740 may store the sound driving voltage data FSD corresponding to a frequency band of the second frequency or lower on the basis of a plurality of temperature ranges and store the sound driving voltage data FSD corresponding to a frequency band of higher than the second frequency regardless of the plurality of temperature ranges. The second frequency may be 1 kHz.

The sound driving voltage data FSD in a frequency band of the second frequency or lower may vary according to the plurality of temperature ranges. In one exemplary embodiment, for example, as shown in FIG. 12, the value of the sound driving voltage data FSD at 200 Hz is the highest in the sixth temperature range TR6, the second highest in the fifth temperature range TR5, the third highest in the fourth temperature range TR4, the fourth highest in the third temperature range TR3, the fifth highest in the second temperature range TR2, and the lowest in the first temperature range TR1. However, in a frequency band of higher than the second frequency, the value of the sound driving voltage data FSD may not vary in the plurality of temperature ranges. In one exemplary embodiment, for example, at 1 kHz or higher, the value of the sound driving voltage data FSD may not vary in the plurality of temperature ranges as shown in FIG. 12.

According to an exemplary embodiment shown in FIG. 12, it is possible to reduce the amount of data stored in the memory 740 while reducing or compensating a difference in the sound pressure level of sound, which is generated by the sound generation device 510, caused by a temperature change of the sound generation device 510.

FIG. 13 is a flowchart illustrating a method of providing sound from a display device according to an exemplary embodiment of the disclosure.

Referring to FIG. 13, in an exemplary embodiment, the temperature sensor 750 senses ambient temperature, converts the sensed temperature into temperature data TD, which is digital data, and outputs the temperature data TD to the main processor 710 (S101 of FIG. 13).

In such an embodiment, the main processor 710 receives the temperature data TD from the temperature sensor 750. The main processor 710 outputs the temperature data TD to the memory 740, and the memory 740 outputs sound driving voltage data FSD corresponding to the temperature data TD to the main processor 710. Since the memory 740 stores the sound driving voltage data on the basis of a plurality of temperature ranges, the sound driving voltage data FSD may be determined according to a temperature range including the temperature of the temperature data TD (S102 of FIG. 13).

In such an embodiment, the main processor 710 generates sound data SD based on the sound driving voltage data FSD and outputs the sound data SD. The main processor 710 may generate the sound data SD using sound source data SSD and the sound driving voltage data FSD. The sound source data SSD may be a sound signal or a video call signal input through the mobile communication module. Alternatively, the sound source data SSD may be a sound signal stored in a non-volatile memory, such as a flash memory of the display device 10. The main processor 710 outputs the sound data SD to the sound driving circuit 340 of the display circuit board 310 (S103 of FIG. 13).

In such an embodiment, the sound driving circuit 340 generates sound driving voltages according to the sound data SD of the main processor 710 and outputs the sound driving voltages to the sound generation device 510. The sound driving voltages may include a first drive voltage and a second drive voltage. The first drive voltage may be applied to the first electrode 512 of the sound generation device 510 through the sound circuit board 520, and the second drive voltage may be applied to the second electrode 513 of the sound generation device 510 through the sound circuit board 520. The sound generation device 510 may contract or expand according to the first drive voltage and the second drive voltage and output sound by vibrating the display panel 300 (S104 of FIG. 13).

According to an exemplary embodiment shown in FIG. 13, the sound driving voltage data FSD is selected from the memory 740 based on temperature data of the temperature sensor 750, and the sound data SD is generated based on the selected sound driving voltage FSD and output to the sound driving circuit 340. Accordingly, the sound driving circuit 340 may generate sound driving voltages corresponding to the sound data SD compensated based on the temperature and may output the sound driving voltages to the sound generation device 510. Therefore, it is possible to reduce or compensate a difference in the sound pressure level of sound, which is generated by the sound generation device 510, caused by a temperature change of the sound generation device 510.

Figure 14A:
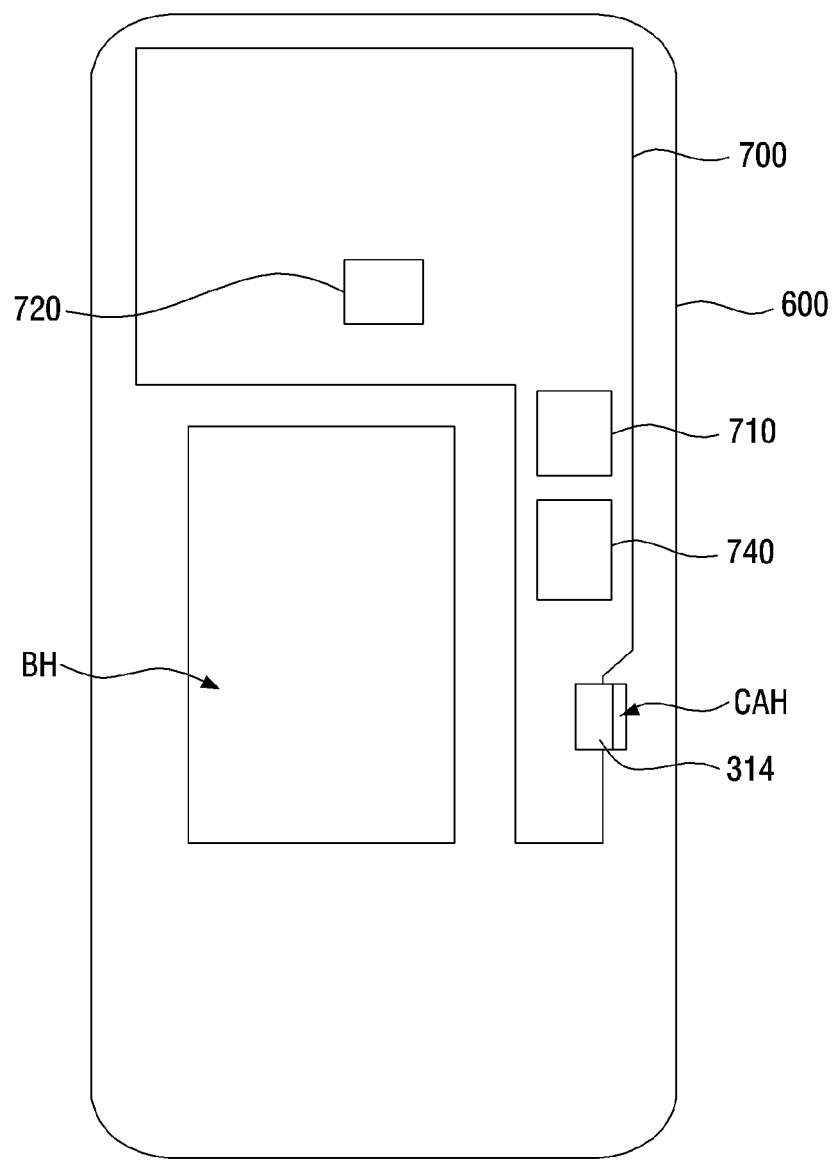
FIG. 14A is a bottom view showing an exemplary embodiment of a middle frame and a main circuit board attached under the display panel of FIG. 3.
Figure 14B:
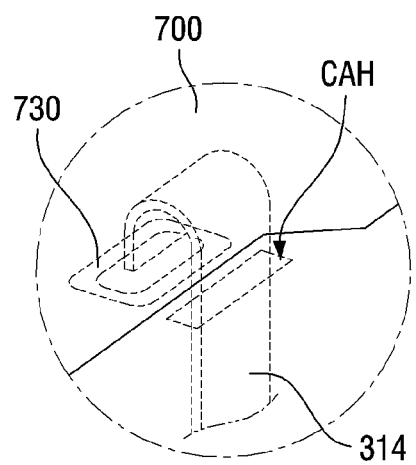
FIG. 14B is an enlarged perspective view of the encircled portion of FIG. 14A.

FIG. 14A is a bottom view showing an exemplary embodiment of a middle frame and a main circuit board attached under the display panel of FIG. 3. FIG. 14B is an enlarged perspective view of the encircled portion of FIG. 14A.

The exemplary embodiment shown in FIGS. 14A and 14B is substantially the same as the exemplary embodiment shown in FIGS. 4A and 4B except that the temperature sensor 750 is omitted from the main circuit board 700. The same or like elements shown in FIGS. 14A and 14B have been labeled with the same reference characters as used above to describe the exemplary embodiment shown in FIGS. 4A and 4B, and any repetitive detailed description thereof will hereinafter be omitted or simplified.

Figure 15:
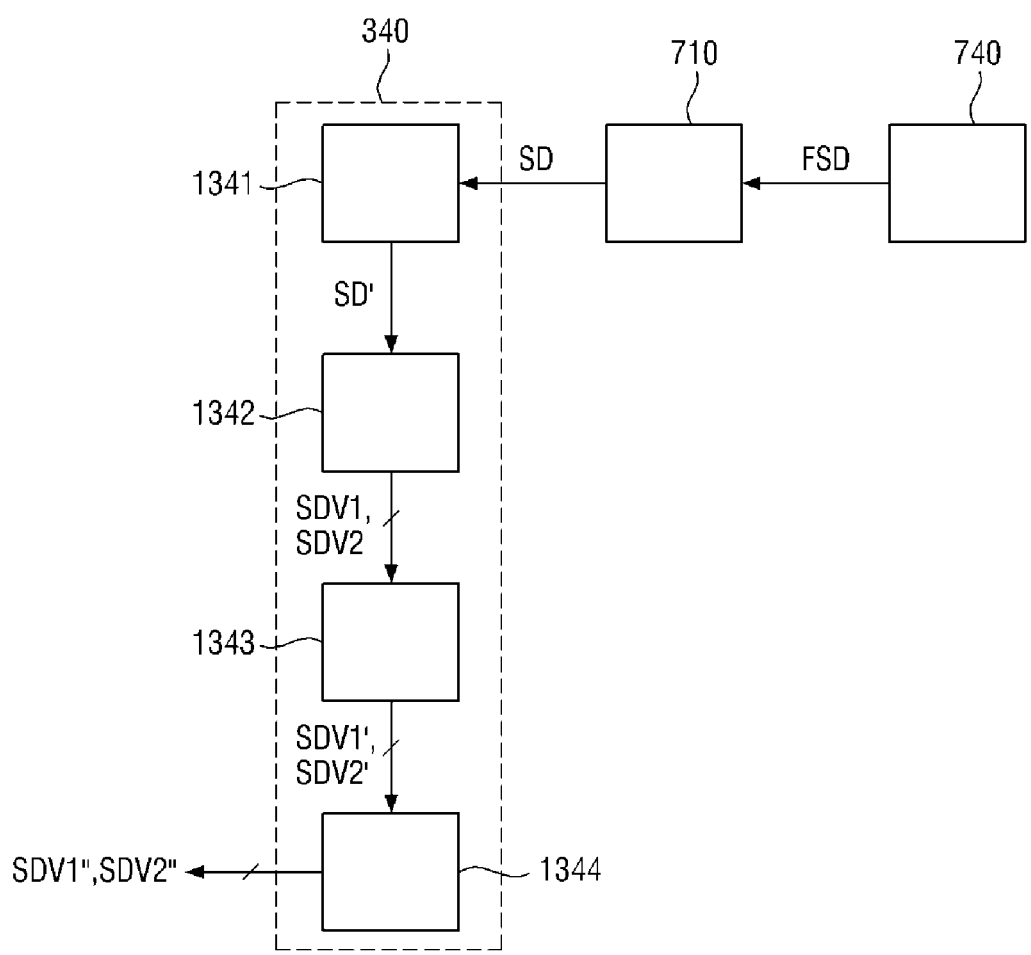
FIG. 15 is a block diagram showing a sound driving circuit of a display circuit board and a main processor and a memory of a main circuit board according to an exemplary embodiment of the disclosure.

In an exemplary embodiment, as shown in FIGS. 14A and 14B, the display device 10 may not include the temperature sensor 750, and the memory 740 may not store sound driving voltage data on the basis of a plurality of temperature ranges. The memory 740 may store one piece of sound driving voltage data regardless of temperature. In such an embodiment, the sound driving circuit 340 of FIGS. 14A and 14B includes a temperature compensator 1344 as shown in FIG. 15 such that the ambient temperature of the sound generation device 510 may be applied to sound driving voltages generated by the sound driving circuit 340. An exemplary embodiment of a method in which the sound driving circuit 340 compensates for sound driving voltages according to the temperature will hereinafter be described in detail with reference to FIG. 15.

FIG. 15 is a block diagram showing a sound driving circuit of a display circuit board and a main processor and a memory of a main circuit board according to an exemplary embodiment of the disclosure.

Referring to FIG. 15, in an exemplary embodiment, the main processor 710 may receive sound driving voltage data FSD stored in the memory 740. The main processor 710 may generate sound data SD using sound source data SSD and the sound driving voltage data FSD. The sound source data SSD may be a sound signal or a video call signal input through the mobile communication module. Alternatively, the sound source data SSD may be a sound signal stored in a non-volatile memory, such as a flash memory of the display device 10. The main processor 710 outputs the sound data SD to the sound driving circuit 340 of the display circuit board 310 through the cable 314.

In an exemplary embodiment, as shown in FIG. 15, the sound drive circuit 340 may include a DSP 1341, a DAC 1342, an AMP 1343, and a temperature compensator 1344.

The DSP 1341 receives the sound data SD from the main processor 710. The DSP 1341 may perform digital signal processing on the sound data SD. In one exemplary embodiment, for example, the DSP 1341 may perform a high-pass filter signal processing, a low-pass filter signal processing, or a band-pass filter signal processing on the sound data SD. In an exemplary embodiment, where the sound data SD does not perform signal processing, the DSP 1341 may be omitted.

The DAC 1342 converts sound data SD' output from the DSP into sound driving voltages which are analog signals. The sound driving voltages may include a first drive voltage SDV1 and a second drive voltage SDV2.

The AMP 1343 may include a plurality of operational AMPs. The AMP 1343 may amplify the sound driving voltages using the plurality of operational AMPs and output amplified sound driving voltages SDV1' and SDV2'.

The temperature compensator 1344 applies the ambient temperature to the sound driving voltages SDV1' and SDV2' output from the AMP 1343 or compensated the sound driving voltages SDV1' and SDV2' output from the AMP 1343 based on the ambient temperature. The temperature compensator 1344 outputs sound driving voltages SDV1" and SDV2", which is converted or compensated based on the ambient temperature, to the sound generation device 510 through the sound circuit board 520. The first drive voltage SDV1" and the second drive voltage SDV2" may be respectively applied to the first electrode 512 and the second electrode 513 of the sound generation device 510 through the sound circuit board 520. The sound generation device 510 may contract or expand in response to the first drive voltage SDV1" and the second drive voltage SDV2" and output sound by vibrating the display panel 300.

Figure 16:
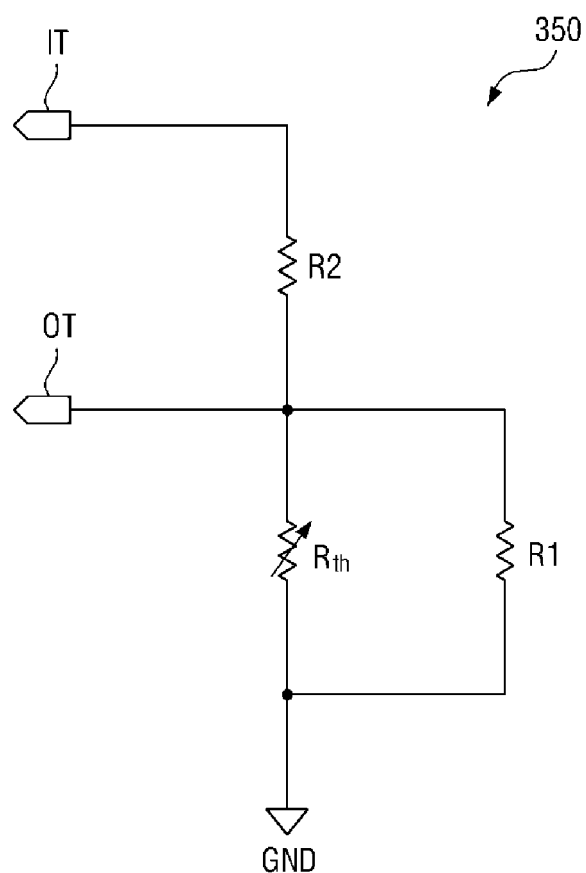
FIG. 16 is a circuit diagram showing an exemplary embodiment of a temperature compensator of a sound driving circuit.

FIG. 16 is a circuit diagram showing an exemplary embodiment of a temperature compensator of a sound driving circuit.

Referring to FIG. 16, an exemplary embodiment of the temperature compensator 1344 may include an input terminal IT, a first resistor R1, a second resistor R2, a temperature-resistant device Rth, and an output terminal OT.

The sound driving voltages SDV1' and SDV2' output from the AMP 1343 are input to the input terminal IT.

The first resistor R1 is connected between the input terminal IT and the output terminal OT. The temperature-resistant element Rth and the second resistor R2 are connected in parallel between the output terminal OT and a ground voltage source GND. A resistance value RV1 of the first resistor R1 may be greater than a resistance value RV2 of the second resistor R2. In the range from −30° C. to 30° C., a resistance value RVth of the temperature-resistant device Rth may be greater than the resistance value RV1 of the first resistor R1 and the resistance value RV2 of the second resistor R2.

A resistance value RVcom of the parallel resistance of the temperature-resistant element Rth and the second resistor R2 may be calculated as shown in Equation 1.

$$RVcom = \frac{1}{\frac{1}{RVth} + \frac{1}{RV2}} = \frac{RVth \times RV2}{RV2 + RVth} \quad \text{[Equation 1]}$$

In Equation 1, RVcom denotes the resistance value of the parallel resistance of the temperature-resistant element Rth and the second resistor R2, RVth denotes the resistance value of the temperature-resistant device Rth, and RV2 denotes the resistance value of the second resistor R2.

A voltage Vout output to the output terminal OT may be calculated as shown in Equation 2.

$$Vout = Vin \times \frac{RVcom}{VR1 + RVcom} = Vin \times \frac{\frac{RVth \cdot RV2}{RV2 + RVth}}{\frac{RVth \cdot RV2}{RV2 + RVth} + VR1} = Vin \times \frac{RVth \cdot RV2}{RVth \cdot RV2 + VR1(RVth + RV2)} \quad \text{[Equation 2]}$$

In Equation 2, Vout denotes the voltage output to the output terminal OT, Vin denotes a voltage input to the input terminal IT, and VR1 denotes the resistance value of the first resistor R1.

Figure 17:
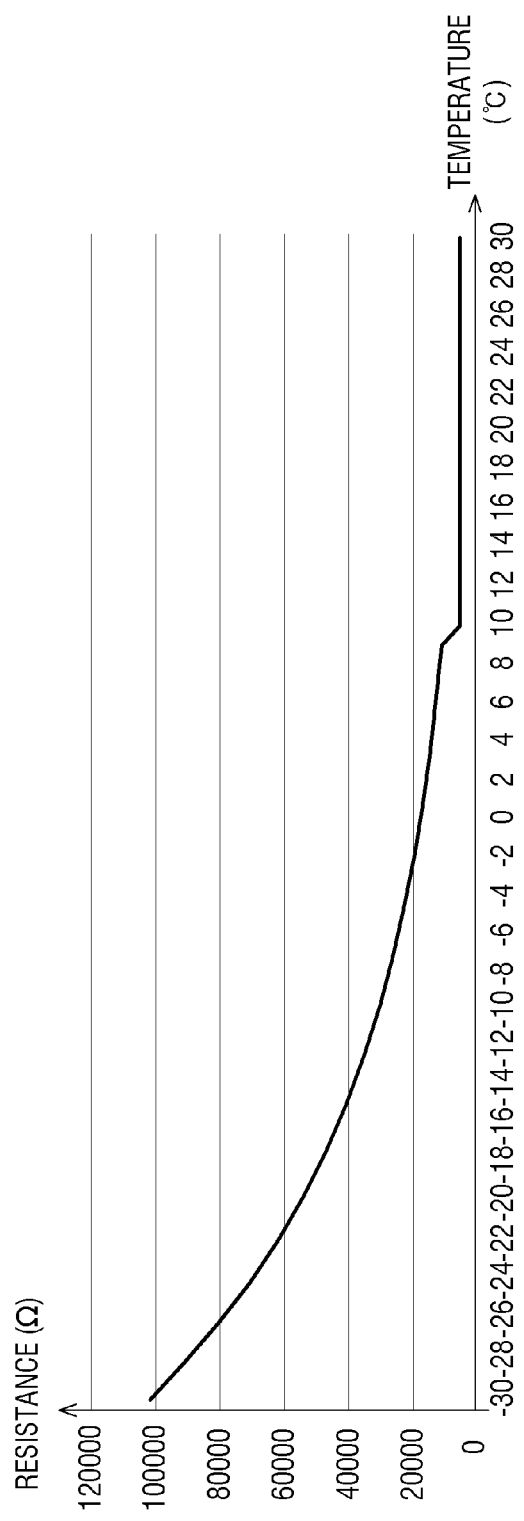
FIG. 17 is a graph showing a resistance value versus the temperature of a temperature-resistant device.

In an exemplary embodiment, the resistance value RVth of the temperature-resistant device Rth may be inversely proportional to the temperature as shown in FIG. 17. In such an embodiment, the resistance value RVth of the temperature-resistant device Rth may be reduced as the temperature increases. In FIG. 17, the X-axis indicates the ambient temperature (° C.) of the temperature-resistant device Rth, and the Y-axis indicates the resistance value RVth of the temperature-resistant device Rth.

Since the resistance value RVth of the temperature-resistant device Rth varies according to the temperature, the sound driving voltages SDV1" and SDV2" output to the output terminal OT of the temperature compensator 1344 may vary according to the temperature. In such an embodiment, the sound driving voltages SDV1" and SDV2", which is compensated or converted based on the temperature, may be output to the output terminal OT of the temperature compensator 1344.

According to an exemplary embodiment shown in FIGS. 15 and 16, the temperature compensator 1344 of the sound driving circuit 340 outputs the sound driving voltages SDV1" and SDV2" which is compensated or converted based on the temperature using the temperature-resistant device Rth. Accordingly, in such an embodiment, the sound generation device 510 may output sound by vibrating the display panel 300 according to the sound driving voltages SDV1" and SDV2" which is compensated or converted based on the temperature. Therefore, in such an embodiment, it is possible to reduce or compensate a difference in the sound pressure level of sound, which is generated by the sound generation device 510, caused by a temperature change of the sound generation device 510.

Figure 18:
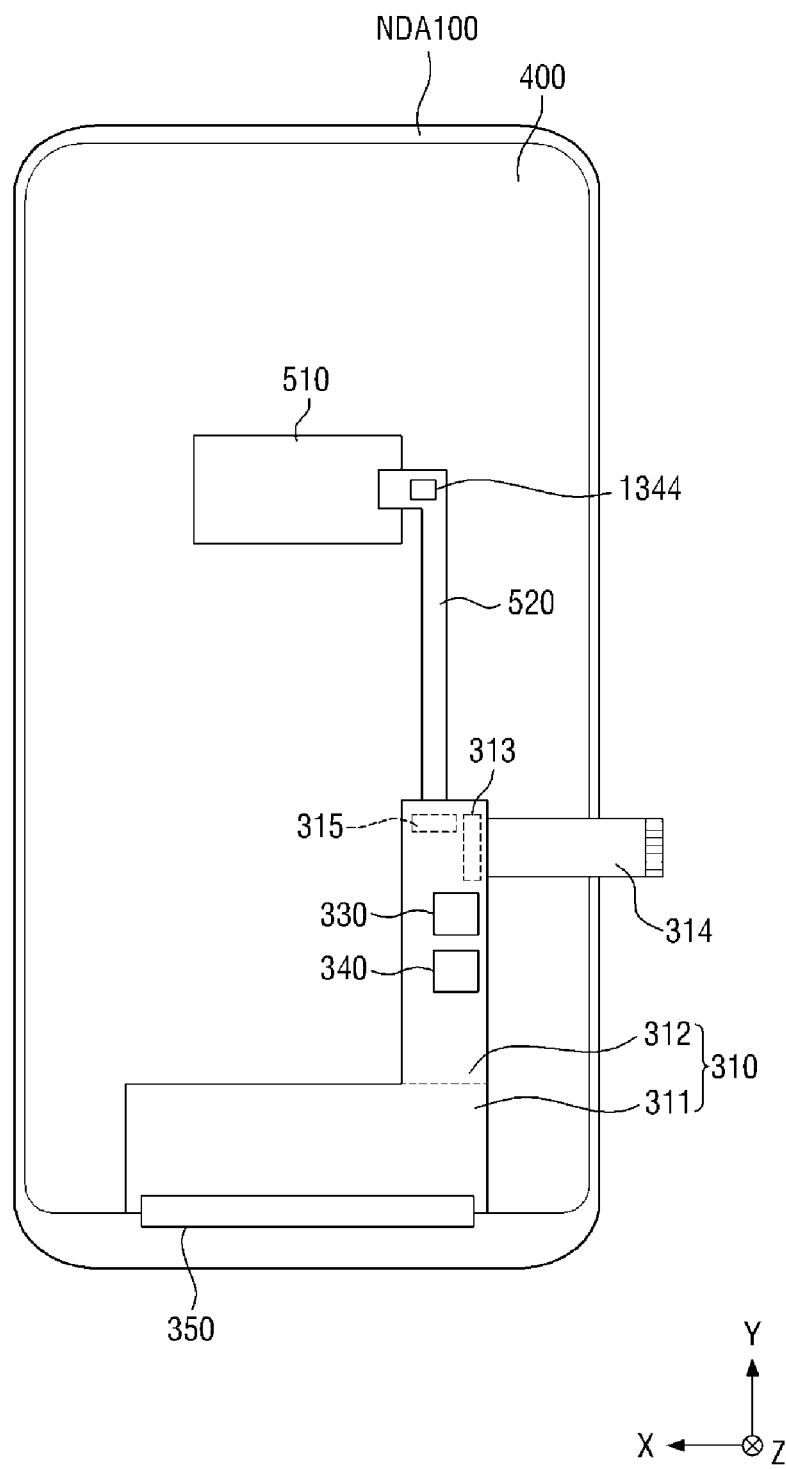
FIG. 18 is a bottom view showing an exemplary embodiment of a display panel attached to the cover window of FIG. 2.
Figure 19:
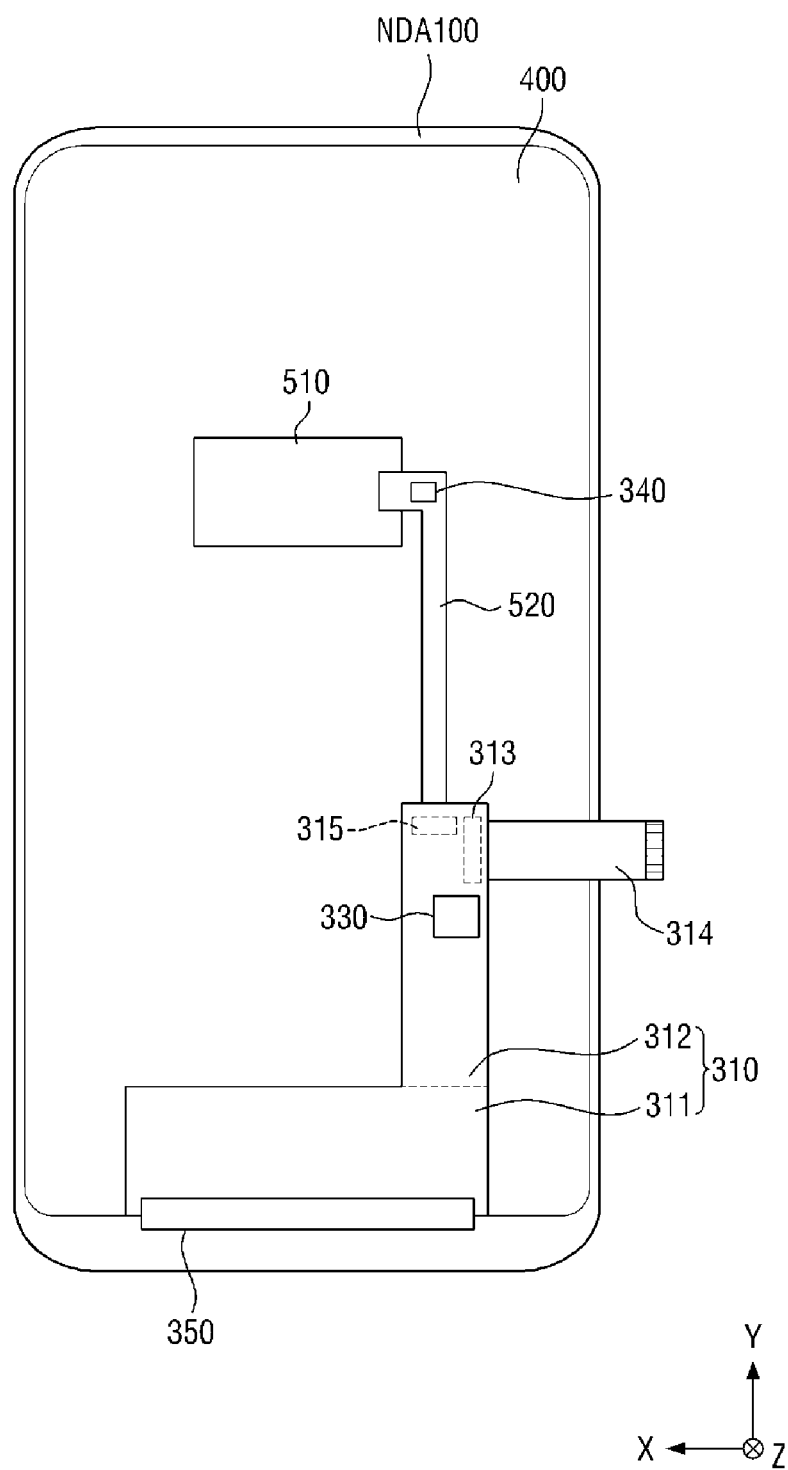
FIG. 19 is a bottom view showing an exemplary embodiment of a display panel attached to the cover window of FIG. 2.

Since the temperature compensator 1344 compensates for the sound driving voltages SDV1" and SDV2" for driving the sound generation device 510 according to the temperature, the temperature compensator 1344 may be disposed close to the sound generation device 510. In one exemplary embodiment, for example, as shown in FIG. 18, the temperature compensator 1344 may not be included in the sound driving circuit 340 and may be disposed on the sound circuit board 520. In such an embodiment, the temperature compensator 1344 may be disposed closer to one end of the sound circuit board 520 attached to the sound generation device 510 than the opposite end of the sound circuit board 520 at which a connection terminal inserted in the second connector 315 of the display circuit board 310 is provided. Alternatively, as shown in FIG. 19, the sound driving circuit 340 including the temperature compensator 1344 may be disposed on the sound circuit board 520 instead of the display circuit board 310. In such an embodiment, the sound driving circuit 340 may be disposed closer to the end of the sound circuit board 520 attached to the sound generation device 510 than the opposite end of the sound circuit board 520 at which a connection terminal inserted in the second connector 315 of the display circuit board 310 is provided.

Figure 20:
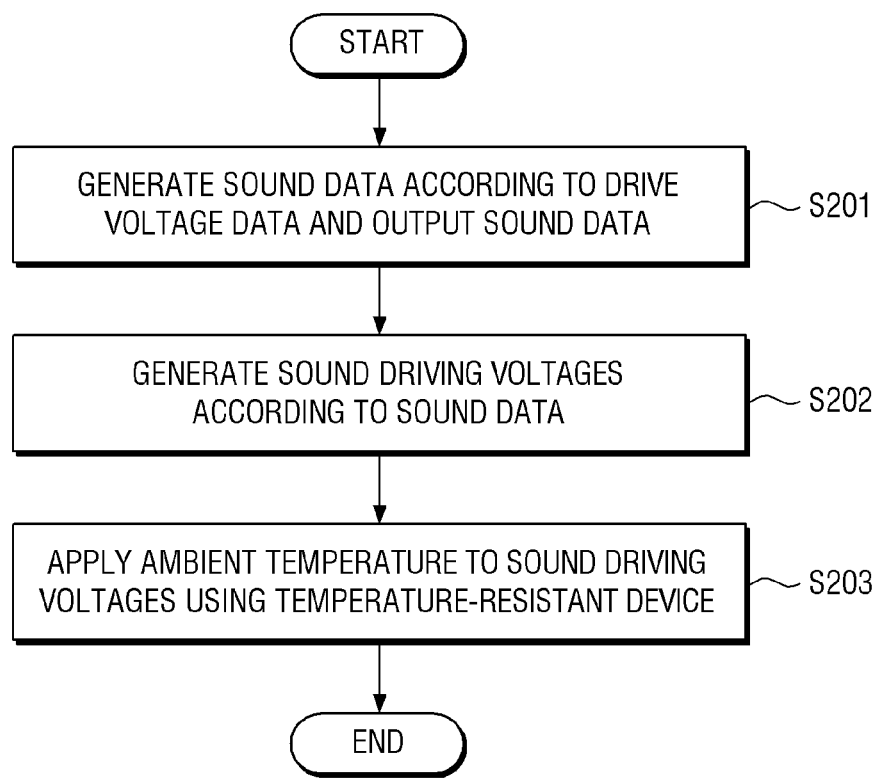
FIG. 20 is a flowchart illustrating a method of providing sound from a display device according to an exemplary embodiment of the disclosure.

FIG. 20 is a flowchart illustrating a method of providing sound from a display device according to an exemplary embodiment of the disclosure.

In an exemplary embodiment, the main processor 710 generates sound data SD based on sound driving voltage data FSD and outputs the sound data. The main processor 710 may generate the sound data SD using sound source data SSD and the sound driving voltage data FSD. The sound source data SSD may be a sound signal or a video call signal input through the mobile communication module. Alternatively, the sound source data SSD may be a sound signal stored in a non-volatile memory, such as a flash memory of the display device 10. The main processor 710 outputs the sound data SD to the sound driving circuit 340 of the display circuit board 310 (S201 of FIG. 20).

In such an embodiment, the sound driving circuit 340 generates sound driving voltages based on the sound data SD of the main processor 710. The DSP 1341 of the sound driving circuit 340 may perform digital signal processing on the sound data SD, the DAC 1342 may convert sound data SD' output from the DSP 1341 into sound driving voltages SDV1 and SDV2, which are analog signals, and the AMP 1343 may amplify the sound driving voltages SDV1 and SDV2 using the plurality of operational AMPs and output amplified sound driving voltages SDV1' and SDV2' (S202 of FIG. 20).

In such an embodiment, the temperature compensator 1344 of the sound driving circuit 340 outputs sound driving voltages SDV1" and SDV2", which is compensated or converted based on the ambient temperature by the temperature-resistant device Rth, to the sound generation device 510 (S203 of FIG. 20). The first drive voltage SDV1" and the second drive voltage SDV2" may be respectively applied to the first electrode 512 and the second electrode 513 of the sound generation device 510 through the sound circuit board 520. The sound generation device 510 may contract or expand in response to the first drive voltage SDV1" and the second drive voltage SDV2" and output sound by vibrating the display panel 300.

According to exemplary embodiments of the display device and the method of providing sound from the display device, sound driving voltage data is selected from a memory based on temperature data of a temperature sensor, and sound data is generated based on the selected sound driving voltage data and output to a sound driving circuit. Accordingly, the sound driving circuit may generate sound driving voltages corresponding to the sound data which is compensated or converted based on the temperature, and output the sound driving voltages to a sound generation device. Therefore, it is possible to reduce or compensate a difference in the sound pressure level of sound, which is generated by the sound generation device, caused by a temperature change of the sound generation device.

According to exemplary embodiments of the display device and the method of providing sound from the display device, a temperature compensator of a sound driving circuit outputs sound driving voltages which is compensated or converted based on the temperature using a temperature-resistant device. Accordingly, a sound generation device may output sound by vibrating a display panel corresponding to the sound driving voltages which is compensated or converted based on the temperature. Therefore, it is possible to reduce or compensate a difference in the sound pressure level of the sound, which is generated by the sound generation device, caused by a temperature change of the sound generation device.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display device comprising:
   a display panel;
   a sound generation device disposed on a surface of the display panel, wherein the sound generation device vibrates the display panel based on sound driving voltages to output sound;
   a sound driving circuit which generates the sound driving voltages, which is compensated based on an ambient temperature of the sound generation device, based on sound data and supplies the sound driving voltages to the sound generation device;
   a temperature sensor which senses the temperature and output temperature data;
   a memory which outputs sound driving voltage data corresponding to the temperature data; and
   a main processor which generates the sound data based on drive voltage data corresponding to a frequency and output the sound data to the sound driving circuit.

2. The display device of claim 1, wherein the memory stores sound driving voltage data on the basis of a plurality of temperature ranges.

3. The display device of claim 2, wherein the memory selects sound driving voltage data of one of the plurality of temperature ranges and outputs the selected sound driving voltage data to the main processor.

4. The display device of claim 2, wherein
   the plurality of temperature ranges includes a first temperature range and a second temperature range lower than the first temperature range, and
   a maximum difference between sound driving voltage data of the first temperature range and sound driving voltage data of the second temperature range in a frequency domain of a first frequency or lower is greater than a maximum difference between sound driving voltage data of the first temperature range and sound driving voltage data of the second temperature range in a frequency domain of a higher frequency than the first frequency.

5. The display device of claim 2, wherein
   the plurality of temperature ranges include a first temperature range and a second temperature range lower than the first temperature range,
   sound driving voltage data of a second frequency or lower in the first temperature range differs from sound driving voltage data of the second frequency or lower in the second temperature range, and
   sound driving voltage data of a higher frequency than the second frequency in the first temperature range is identical to sound driving voltage data of the higher frequency than the second frequency in the second temperature range.

6. The display device of claim 1, further comprising:
   a main circuit board, on which the temperature sensor, the memory and the main processor are disposed.

7. The display device of claim 6, further comprising:
   a display circuit board attached to a side of the display panel and disposed on the surface of the display panel, wherein the sound driving circuit is disposed on the display circuit; and
   a cable which connects the display circuit board and the main circuit board to each other.

8. The display device of claim 7, further comprising:
   a bracket disposed between the display panel and the main circuit board,
   wherein a cable hole is defined through the bracket, and the cable is disposed through the cable hole.

9. The display device of claim 1, wherein the sound driving circuit comprises:
   a digital-analog converter which generates the sound driving voltages corresponding to the sound data; and
   a temperature compensator which compensates the sound driving voltages based on the ambient temperature of the sound generation device.

10. A display device comprising:
    a display panel;
    a sound generation device disposed on a surface of the display panel, wherein the sound generation device vibrates the display panel based on sound driving voltages to output sound; and
    a sound driving circuit which generates the sound driving voltages, which is compensated based on an ambient temperature of the sound generation device, based on sound data and supplies the sound driving voltages to the sound generation device,
    wherein the sound driving circuit comprises a temperature compensator which compensates the sound driving voltages based on the ambient temperature of the sound generation device,
    wherein the temperature compensator comprises:
    an input terminal and an output terminal;
    a first resistor disposed between the input terminal and the output terminal; and a second resistor and a temperature-resistant device disposed in parallel between the output terminal and a low-potential voltage source, and a resistance value of the temperature-resistant device varies with the temperature.

11. The display device of claim 10, wherein the resistance value of the temperature-resistant device is inversely proportional to the temperature.

12. The display device of claim 10, wherein a sound driving voltage output to the output terminal, a sound driving voltage input to the input terminal, the resistance value of the temperature-resistant device, a resistance value of the first resistor, and a resistance value of the second resistor satisfy the following equation:

$$Vout = Vin \times \frac{RVth \cdot RV2}{RVth \cdot RV2 + VR1(RVth + RV2)},$$

wherein
Vout denotes the sound driving voltage output to the output terminal,
Vin denotes the sound driving voltage input to the input terminal,
RVth denotes the resistance value of the temperature-resistant device,
VR1 denotes the resistance value of the first resistor, and
RV2 denotes the resistance value of the second resistor.

13. The display device of claim 10, further comprising:
a display circuit board attached to one side of the display panel and disposed on the surface of the display panel,
wherein the sound driving circuit is disposed on the display circuit board.

14. The display device of claim 10, further comprising:
a display circuit board attached to one side of the display panel and disposed on the surface of the display panel; and
a sound circuit board disposed between the sound generation device and the display circuit board,
wherein the sound driving circuit is disposed on the sound circuit board.

15. The display device of claim 1, further comprising:
a temperature compensator which compensates the sound driving voltages based on the ambient temperature of the sound generation device;
a display circuit board attached to one side of the display panel and disposed on the surface of the display panel; and
a sound circuit board disposed between the sound generation device and the display circuit board,
wherein the sound driving circuit is disposed on the sound circuit board.

16. A method of providing sound from a display device, the method comprising:
sensing a temperature with a temperature sensor of the display device and outputting temperature data based on the temperature sensed by the temperature sensor;
outputting drive voltage data corresponding to a frequency based on the temperature data;
generating sound data based on the drive voltage data corresponding to the frequency;
generating sound driving voltages based on the sound data; and
vibrating, by a sound generation device disposed on a surface of a display panel of the display device, the display panel based on the sound driving voltages to output sound.

17. The method of claim 16, wherein the outputting the drive voltage data corresponding to the frequency based on the temperature data comprises selecting sound driving voltage data of one of a plurality of temperature ranges corresponding to the temperature of the temperature data and outputting the selected sound driving voltage data.

18. The method of claim 17, wherein
the plurality of temperature ranges include a first temperature range and a second temperature range lower than the first temperature range, and
a maximum difference between sound driving voltage data of the first temperature range and sound driving voltage data of the second temperature range in a frequency domain of a first frequency or lower is greater than a maximum difference between sound driving voltage data of the first temperature range and sound driving voltage data of the second temperature range in a frequency domain of a higher frequency than the first frequency.

19. The method of claim 17, wherein
the plurality of temperature ranges includes a first temperature range and a second temperature range lower than the first temperature range,
sound driving voltage data of a second frequency or lower in the first temperature range differs from sound driving voltage data of the second frequency or lower in the second temperature range, and
sound driving voltage data of a higher frequency than the second frequency in the first temperature range is identical to sound driving voltage data of the higher frequency than the second frequency in the second temperature range.

20. A method of providing sound from a display device, the method comprising:
receiving drive voltage data corresponding to a frequency stored in a memory, generating sound data based on the drive voltage data corresponding to the frequency, and outputting the sound data;
generating sound driving voltages based on the sound data;
applying an ambient temperature to the sound driving voltages; and
vibrating, by a sound generation device disposed on a surface of a display panel of the display device, the display panel based on the sound driving voltages to output sound.

21. The method of claim 20, wherein the applying the ambient temperature to the sound driving voltages comprises compensating the sound driving voltage based on the ambient temperature using a first resistor disposed between an input terminal and an output terminal, a second resistor disposed in parallel between the output terminal and a low-potential voltage source, and a temperature-resistant device, a resistance value of which varies according to a temperature.

22. The method of claim 21, wherein the resistance value of the temperature-resistant device is inversely proportional to the ambient temperature.

23. The method of claim 21, wherein when a sound driving voltage output to the output terminal, a sound driving voltage input to the input terminal, the resistance value of the temperature-resistant device, a resistance value of the first resistor, and a resistance value of the second resistor satisfy the following equation:

$$Vout = Vin \times \frac{RVth \cdot RV2}{RVth \cdot RV2 + VR1(RVth + RV2)},$$

wherein
Vout denotes the sound driving voltage output to the output terminal,
Vin denotes the sound driving voltage input to the input terminal,
RVth denotes the resistance value of the temperature-resistant device,
VR1 denotes the resistance value of the first resistor, and
RV2 denotes the resistance value of the second resistor.

* * * * *